(12) United States Patent
Sugano et al.

(10) Patent No.: US 10,900,567 B2
(45) Date of Patent: Jan. 26, 2021

(54) TRANSMISSION APPARATUS

(71) Applicant: HONDA MOTOR CO., LTD., Tokyo (JP)

(72) Inventors: Takeshi Sugano, Wako (JP); Hirokazu Tanaka, Wako (JP); Hiromasa Emura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 27 days.

(21) Appl. No.: 16/229,924

(22) Filed: Dec. 21, 2018

(65) Prior Publication Data

US 2019/0203835 A1 Jul. 4, 2019

(30) Foreign Application Priority Data

Dec. 28, 2017 (JP) .................................. 2017-252991
Sep. 27, 2018 (JP) .................................. 2018-181673

(51) Int. Cl.
| | |
|---|---|
| *F16H 63/00* | (2006.01) |
| *F16H 63/50* | (2006.01) |
| *F16H 63/18* | (2006.01) |
| *F16H 59/68* | (2006.01) |
| *F16H 57/02* | (2012.01) |

(Continued)

(52) U.S. Cl.
CPC ............ *F16H 63/502* (2013.01); *B62K 11/04* (2013.01); *F02D 29/02* (2013.01); *F16H 57/02* (2013.01); *F16H 59/68* (2013.01); *F16H 63/18* (2013.01); *B60Y 2200/12* (2013.01)

(58) Field of Classification Search
CPC ........ F16H 63/502; F16H 59/68; F16H 57/02; F16H 63/18; F16H 59/02; F16H 63/30; F16H 63/42; F16H 2059/026; B62K 11/04; F02D 29/02; B60Y 2200/12; B62M 25/08; B62M 6/50

See application file for complete search history.

(56) References Cited

U.S. PATENT DOCUMENTS

| | | | |
|---|---|---|---|
| 6,357,545 B1 * | 3/2002 | Hori ........................ | F02B 61/02 |
| | | | 180/219 |
| 7,810,621 B2 | 10/2010 | Zenno | |
| 8,707,814 B2 | 4/2014 | Saitoh | |

(Continued)

FOREIGN PATENT DOCUMENTS

| | | |
|---|---|---|
| DE | 10 2016 204 014 A1 | 10/2016 |
| DE | 10 2016 205 016 A1 | 10/2016 |

(Continued)

*Primary Examiner* — Victor L MacArthur
(74) *Attorney, Agent, or Firm* — Carrier Blackman & Associates, P.C.; Joseph P. Carrier; William D. Blackman

(57) ABSTRACT

In a vehicle engine transmission apparatus, a shift spindle sensor is mounted in and extends through a through spindle sensor mount hole defined in a spindle sensor mount seat formed on a portion of a case, and a shift drum sensor is mounted in and extends through a through drum sensor mount hole defined in a drum sensor mount seat formed on a portion of the case. The direction in which the shift spindle sensor is mounted and the direction in which the shift drum sensor is mounted are same as each other. The shift spindle sensor and the shift drum sensor can be easily attached to and detached from their mount seats and can be well serviced for excellent maintainability, and the mount seats can be machined with ease and excellent machinability.

11 Claims, 20 Drawing Sheets

(51) Int. Cl.
*B62K 11/04* (2006.01)
*F02D 29/02* (2006.01)

(56) References Cited

U.S. PATENT DOCUMENTS

| | | | |
|---|---|---|---|
| 2005/0081664 A1* | 4/2005 | Kawakubo | F16H 3/089 |
| | | | 74/337.5 |
| 2005/0085329 A1* | 4/2005 | Kawakubo | F16H 57/02 |
| | | | 475/219 |
| 2005/0087032 A1* | 4/2005 | Kawakubo | F16H 63/18 |
| | | | 74/473.1 |
| 2010/0082210 A1* | 4/2010 | Kobayashi | F16H 61/32 |
| | | | 701/66 |
| 2011/0239805 A1* | 10/2011 | Fujimoto | F16H 63/18 |
| | | | 74/473.12 |
| 2015/0276053 A1 | 10/2015 | Mizuno et al. | |
| 2016/0091088 A1* | 3/2016 | Fujimoto | F16H 61/32 |
| | | | 74/335 |
| 2016/0195170 A1 | 7/2016 | Sugano et al. | |
| 2016/0290497 A1* | 10/2016 | Nakamura | F16H 61/0213 |
| 2017/0082048 A1* | 3/2017 | Endo | F16H 61/04 |
| 2017/0204971 A1* | 7/2017 | Nakai | F16H 59/0217 |

FOREIGN PATENT DOCUMENTS

| | | |
|---|---|---|
| EP | 3 196 511 A1 | 7/2017 |
| JP | 6069774 B2 | 2/2017 |

\* cited by examiner

TRANSMISSION APPARATUS

TECHNICAL FIELD

The present invention relates to a transmission apparatus incorporated in a power unit mounted on a small-size vehicle.

BACKGROUND ART

Transmission apparatus of the type described generally have a normally meshing type transmission that operates to achieve a desired transmission gear position by rotationally moving a shift spindle in response to a gear shifting action, converting the rotary motion of the shift spindle into intermittent rotary motion of a shift drum with a shift drum actuating mechanism, axially moving a shift fork with the intermittent rotary motion of the shift drum, and moving a shift gear of the transmission with the axial motion of the shift fork, thereby selecting an effectively working transmission gear pair out of a plurality of intermeshing transmission gear pairs.

Among those transmission apparatus, there is a transmission apparatus having a neutral switch or shift drum sensor for detecting the rotational motion of the shift drum and a shifter switch or shift spindle sensor for detecting the rotational motion of the shift spindle in order to reliably determine whether or not the transmission is in a neutral position (see, for example, Patent Document 1).

PRIOR ART DOCUMENT

Patent Document

[Patent Document 1]
Japanese Patent No. 6 069 774

In the transmission apparatus disclosed in Patent Document 1, the neutral switch or shift drum sensor for detecting a neutral rotational position of the shift drum is mounted on a rear wall of an upper crankcase member or upper crankcase section that faces the outer circumferential surface of the shift drum.

In the transmission apparatus disclosed in Patent Document 1 the shifter switch or shift spindle sensor for detecting the rotational motion of the shift spindle is illustrated in a configurational diagram (FIG. 6) of a transmission control system. Meanwhile, the shifter switch or shift spindle sensor is not illustrated in a side elevational view (FIG. 2) of a power unit and a plan view (FIG. 3) of the power unit.

Referring to FIGS. 2 and 3 of Patent Document 1, the neutral switch, denoted by S4, is installed on a rear surface 32b of the upper crankcase member, denoted by 32, substantially from behind, so that the neutral switch S4 is mounted on a substantially rearwardly facing mount seat face on the upper crankcase member 32.

As illustrated in FIGS. 1 through 5 of Patent Document 1, in addition to the neutral switch S4, a third rotational speed sensor S3 is mounted on the rear surface 32b of the upper crankcase member 32. However, a shifter switch 135 is not illustrated.

The shifter switch 135 is not illustrated on an upper surface 32a of the upper crankcase member 32 either.

SUMMARY OF THE INVENTION

Underlying Problems to be Solved by the Invention

In the transmission apparatus disclosed in Patent Document 1, the shifter switch 135 seems to be mounted on the upper crankcase member 32 in view of the position of the shift spindle, denoted by 84, illustrated in FIG. 2. However the shifter switch 135 is not present on the rear surface 32b of the upper crankcase member 32, and any structure is not disclosed wherein the mount seat face for the shifter switch 135 and the mount seat face for the neutral switch S4 lie parallel to each other.

Therefore, the neutral switch and the shifter switch are installed perpendicularly on and removed perpendicularly from the respective mount seat faces in different directions, and hence cannot be well serviced when they are attached to and detached from their mount seat faces.

Furthermore, when the mount seat faces for the neutral switch and the shifter switch are machined, their machinability is poor.

The present invention has been made in view of the above problems. It is an object of the present invention to provide a transmission apparatus that includes a shift spindle sensor and a shift drum sensor that can be easily attached to and detached from their mount seats and that can be well serviced for excellent maintainability, and that allows the mount seats respectively for the shift spindle sensor and the shift drum sensor to be machined with ease and excellent machinability.

Means for Solving the Problems

To achieve the above object, there is provided in accordance with the present invention a transmission apparatus incorporated in a power unit mounted on a small-size vehicle and including a shift spindle rotatable in response to a gear shifting action, a shift drum rotatable through a shift drum actuating mechanism by rotation of the shift spindle, and a case covering the shift spindle and the shift drum, the transmission apparatus comprising: a shift spindle sensor for detecting rotary movement of the shift spindle; and a shift drum sensor for detecting rotary movement of the shift drum; wherein the shift spindle sensor is mounted in and extends through a through spindle sensor mount hole defined in a spindle sensor mount seat formed on a predetermined portion of the case; the shift drum sensor is mounted in and extends through a through drum sensor mount hole defined in a drum sensor mount seat formed on a predetermined portion of the case; and a direction in which the shift spindle sensor is mounted in and extends through the through spindle sensor mount hole is same as a direction in which the shift drum sensor is mounted in and extends through the through drum sensor mount hole.

With this arrangement, since the direction in which the shift spindle sensor is mounted in and extends through the through spindle sensor mount hole in the spindle sensor mount seat formed in the predetermined portion of the case is same as the direction in which the shift drum sensor is mounted in and extends through the through drum sensor mount hole in the drum sensor mount seat formed in the predetermined portion of the case, the shift spindle sensor and the shift drum sensor can be installed on and removed from the case on one external side thereof. Therefore, the shift spindle sensor and the shift drum sensor can be installed and removed with ease and can be serviced for excellent maintainability.

Furthermore, as the through spindle sensor mount hole and the through drum sensor mount hole are oriented in the same direction, the spindle sensor mount seat and the drum sensor mount seat can be machined in the same direction with ease for excellent machinability.

In a preferred embodiment of the invention, the shift spindle sensor is a limit switch having a spindle sensor actuator projecting from a spindle sensor body, and is capable of selectively turned on and off in response to advancing and retracting movement of the spindle sensor actuator which is held in contact with a detectable surface on a part of an outer circumferential surface of the shift spindle.

The shift drum sensor is a limit switch having a drum sensor actuator projecting from a drum sensor body, and is capable to be selectively turned on and off in response to advancing and retracting movement of the drum sensor actuator which is held in contact with a detectable surface on a part of an outer circumferential surface of the shift drum.

Further, directions of advancing and retracting movement of the spindle sensor actuator and directions of advancing and retracting movement of the drum sensor actuator are same as each other.

With the above arrangement, inasmuch as the directions in which the spindle sensor actuator is advanced and retracted, and the directions in which the drum sensor actuator is advanced and retracted are the same as each other, accelerations due to the vibrations of the power unit act equally on the spindle sensor actuator and the drum sensor actuator, and any differences due to disturbances between timings at which the shift spindle sensor and the shift drum sensor detect operating states of the transmission apparatus are minimized.

In a preferred embodiment of the invention, the shift spindle and the shift drum have respective rotational central axes extending parallel to each other and are staggered horizontally with respect to each other such that they are kept out of vertical alignment with each other.

The spindle sensor mount seat and the drum sensor mount seat are formed on an upper wall of the case that covers the shift spindle and the shift drum from above.

With the above arrangement, since the spindle sensor mount seat and the drum sensor mount seat are formed on the upper wall of the case that covers the shift spindle and the shift drum from above, the shift spindle sensor mounted on and extending through the spindle sensor mount seat and the shift drum sensor mounted on and extending through the drum sensor mount seat are protected by the crankcase from pebbles or the like flipped up from the ground.

In a preferred embodiment of the invention, at least one of the spindle sensor mount seat and the drum sensor mount seat is disposed on a bottom wall of a recess defined in the case and extending inward from an outer surface of the case.

With the above arrangement, since at least one of the spindle sensor mount seat and the drum sensor mount seat is disposed on a bottom wall of a recess defined in the case and extending inward from an outer surface of the case, at least one of the shift spindle sensor and the shift drum sensor, which is mounted on the mount seat on the bottom wall of the recess, is at least partly housed in the recess and protected from pebbles or the like.

In a further preferred embodiment of the invention, the power unit is suspended from a vehicle body frame of the small-size vehicle through a projecting hanger of the case.

The shift drum sensor is mounted on the drum sensor mount seat on the bottom wall of the recess defined in the hanger.

With the above arrangement, since the shift drum sensor is mounted on the drum sensor mount seat on the bottom wall of the recess defined in the projecting hanger of the case, the shift drum sensor is at least partly housed in the recess in the hanger, and is reliably protected by the hanger from pebbles or the like and easily kept out of interference with other devices.

In a still further embodiment of the invention, a rotational speed sensor for detecting rotation of a transmission gear rotatably supported on a transmission gear shaft of the transmission apparatus is mounted in and extend through the case at a position closer to either one of the shift spindle sensor and the shift drum sensor than to the other of the shift spindle sensor and the shift drum sensor.

In the above arrangement, inasmuch as the rotational speed sensor is mounted on the case at a position closer to either one of the shift spindle sensor than to the shift drum sensor, the rotational speed sensor and either one of the shift spindle sensor and the shift drum sensor are put closely together, creating a space on the case that can effectively be used to place other devices therein.

In an embodiment of the invention, the shift drum sensor is mounted on the drum sensor mount seat formed on a portion of the case adjacent to one end of the shift drum in rotational central axis directions thereof.

Further, the rotational speed sensor is mounted on a portion of the case adjacent to the other end, which is opposite to the one end, of the shift drum in the rotational central axis directions thereof.

With the above arrangement, since the shift drum sensor is mounted on the drum sensor mount seat formed on a portion of the case adjacent to one end of the shift drum in the rotational axis directions thereof, and the rotational speed sensor is mounted on a portion of the case adjacent to the other end, which is opposite to the one end of the shift drum, in the rotational axis directions thereof, the shift drum sensor and the rotational speed sensor are spaced from each other on the respective portions of the case on both ends of the shift drum in the rotational axis directions thereof. Therefore, there is a large space available on the case between the shift drum sensor and the rotational speed sensor for effective use as a space to place other devices therein.

In a preferred embodiment of the invention, at a position separated from the shift spindle sensor along a longitudinal direction of the shift spindle, a second shift spindle sensor for detecting rotary movement of the shift spindle is provided on the case.

According to the above configuration, since rotational movement of the shift spindle is detected not only by the shift spindle sensor but also by the second shift spindle sensor, rotational movement of the shift spindle is detected by the two shift spindle sensors, whereby detection of the rotational movement of the shift spindle can be detected precisely.

In a preferred embodiment of the invention, the first-named shift spindle sensor is for detecting rotary movement of the shift spindle in one direction, and the second shift spindle sensor is for detecting rotary movement of the shift spindle in the other direction.

According to the above configuration, the first named shift spindle sensor and the second shift spindle sensor operate to detect rotary movements in mutually different directions, whereby rotary movements in both the upshifting and downshifting directions can be detected in a distinguished way.

In a further preferred embodiment of the invention, the small-size vehicle includes center frames extending rearward from left and right main frames extending from a head pipe; a fuel tank is mounted between the center frames; a fuel pump unit having a fuel pump with a fuel delivery portion is mounted on a bottom plate of the fuel tank with the fuel delivery portion protruding downward from the bottom plate; the fuel tank is positioned above the case; and at least a portion of the fuel pump unit is in vertically overlapping relation with the first-named shift spindle sensor and the second shift spindle sensor.

According to the above configuration, at least a portion of the fuel pump unit mounted on the bottom plate of the fuel pump and disposed above the case is in overlapping relation with the first-named shift spindle sensor and the second shift spindle sensor. Therefore, the downwardly protruding fuel delivery portion in the central portion of the fuel pump unit is positioned between the two shift spindle sensors with respect to the length direction of the shift spindle and can avoid interference with the two shift spindle sensors. As a result, the fuel pump unit can be installed at a lowered level as close as possible to the case, whereby the bottom plate of the fuel tank, on which the fuel pump unit is mounted, can be lowered with resultant increase of the volume of the fuel tank.

In a preferred embodiment of the invention, the small-size vehicle is mounted thereon with a quick-shifting mechanism for lowering output of the engine to perform speed change operation without transmission clutch operation; the shift spindle is configured to rotate by a shifting operation of a shift lever by way of a link mechanism; a shift sensor is provided for detecting initial movement of the link mechanism due to a shifting action; and the quick-shifting mechanism is operable based on a detection signal from the shift sensor and on detection signals from the first-named shift spindle sensor and the second shift spindle sensor.

According to the above configuration, the small-size vehicle is mounted thereon with a quick-shifting mechanism for lowering output of the engine to perform speed change operation without transmission clutch operation, and the quick-shifting mechanism operates based on a detection signal from the shift sensor for detecting initial movement of the link mechanism due to a shifting action and based on detection signals from the first-named shift spindle sensor and the second shift spindle sensor. The quick-shifting mechanism thus performs engine output reduction upon detecting initial movement of speed change action. The quick-shifting mechanism then operates to cease the engine output reduction upon detection signals from the first-named shift spindle sensor and the second shift spindle sensor. The quick-shifting mechanism thus operates to perform engine output control at a proper timing without transmission clutch operation to lower the transmission torque and to smoothly disconnect the transmission dog clutch, ensuring smooth and quick speed change operation in the transmission.

Effects of the Invention

According to the present invention, the direction in which the shift spindle sensor is mounted in and extends through the through spindle sensor mount hole in the spindle sensor mount seat formed in the predetermined portion of the case is same as the direction in which the shift drum sensor is mounted in and extends through the through drum sensor mount hole in the drum sensor mount seat formed in the predetermined portion of the case. Consequently, the shift spindle sensor and the shift drum sensor can be installed on and removed from the case on one external side thereof. Therefore, the shift spindle sensor and the shift drum sensor can be installed and removed with ease and can be serviced for excellent maintainability.

Further, as the through spindle sensor mount hole and the through drum sensor mount hole are oriented in the same directions, the spindle sensor mount seat and the drum sensor mount seat can be machined in the same direction with ease and hence have excellent machinability.

MODES FOR CARRYING OUT THE INVENTION

A transmission apparatus according to a first embodiment of the present invention will be described in detail below with reference to FIGS. 1 through 9.

Figure 1:
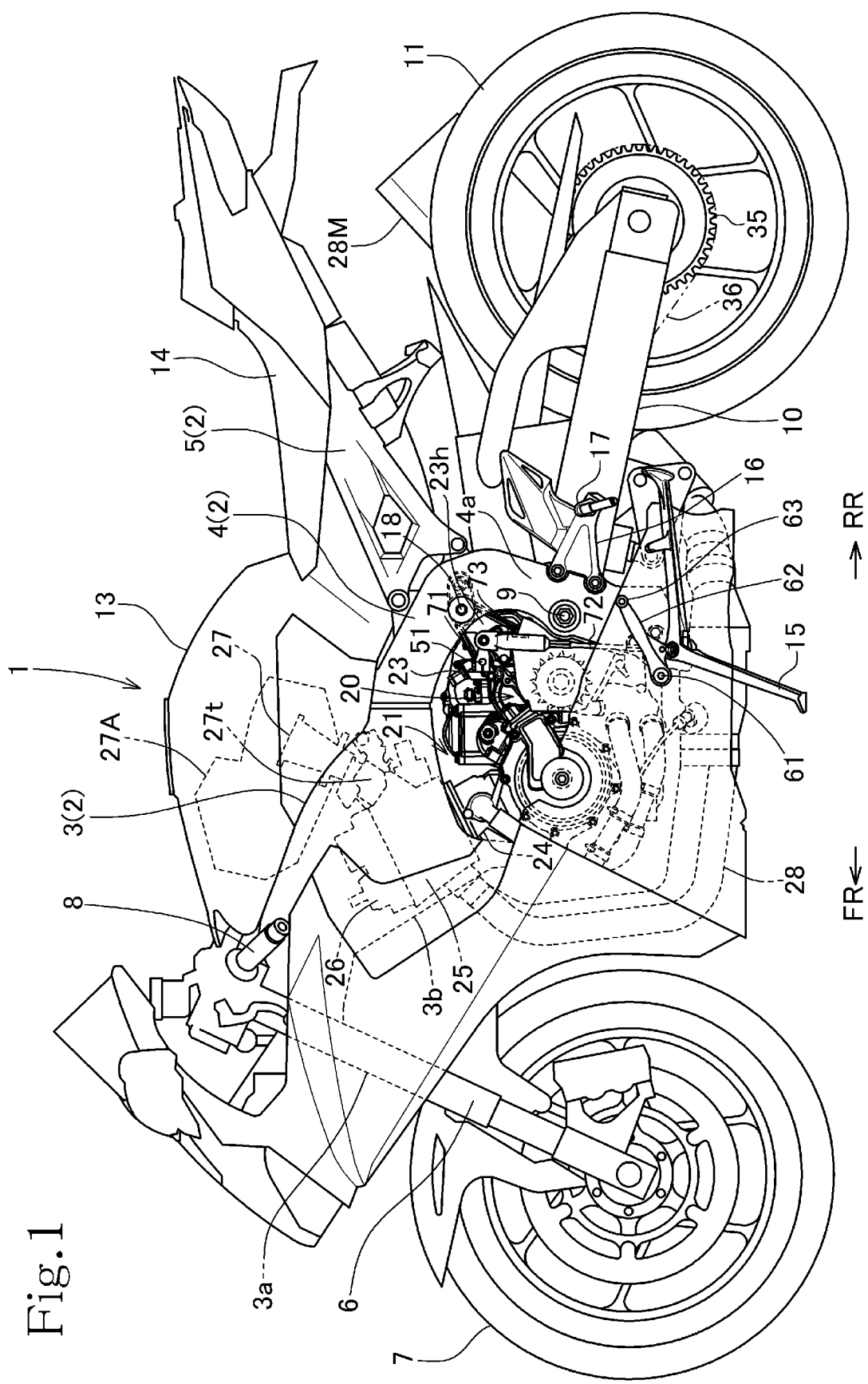
FIG. 1 is a side elevational view of a motorcycle mounted thereon with a transmission apparatus according to a first embodiment of the present invention.

FIG. 1 is a side elevational view of a motorcycle 1 as a saddle-type vehicle that incorporates a transmission apparatus according to the first embodiment of the present invention.

In the present description, forward, rearward, leftward, and rightward directions, and similar directional expressions are defined in accordance with the normal orientations of the motorcycle 1 that include a forward direction along which the motorcycle 1 moves straight ahead. In the drawings, the reference letters FR represent a forward direction, RR a rearward direction, LH a leftward direction, and RH a rightward direction.

As illustrated in FIG. 1, the saddle-type motorcycle 1 includes a vehicle body frame 2 having a pair of left and right main frames 3 extending rearward, i.e., wide frames including respective down frame portions 3b, and a pair of central frames 4 (see FIG. 2) coupled to respective rear ends of the main frames 3 and bent downward into rear fork pivot portions 4a.

A seat rail 5 extends rearward and upward from the bent portions of the central frames 4.

The vehicle body frame 2 also includes a head pipe 3a extending downward from the front ends of the main frames 3. A front wheel 7 is rotatably supported on the lower end of a front fork 6 that is steerably supported by the head pipe 3a. A steering handle 8 is coupled to the upper end of the front fork 6.

A rear fork 10 has a front end angularly movably supported by a pivot shaft 9 on the rear fork pivot portions 4a of the central frames 4. The rear fork 10 extends rearward and has a rear end on which a rear wheel 11 is rotatably supported by a rear axle, so that the rear wheel 11 is vertically swingable about the pivot shaft 9.

A power unit 20 is mounted on the vehicle body frame 2 of the motorcycle 1. The power unit 20 includes an internal combustion engine 21 having a crankcase 23 and a transmission apparatus 30 (FIG. 3) having a manual multistage transmission (hereinafter referred to as "transmission") 31 integrally housed in a rear portion of the crankcase 23. The power unit 20 is suspended from the down frame portions 3b of the main frames 3 and the central frames 4 disposed behind the down frame portions 3b.

A fuel tank 13 is mounted on the main frames 3 and the central frames 4 above the power unit 20, and a rider's seat 14 is supported on the seat rail 5 behind the fuel tank 13.

A side stand 15 pivotally mounted on the lower end of the left central frame 4 for angular movement between a lifted position and a lowered position.

Support brackets 16 have their front ends fixed to the central frames 4 behind the pivot shaft 9 by which the rear fork 10 is supported, and extend rearward. Back steps 17 for placing the rider's feet thereon are supported on and project laterally outward from the rear ends of the support brackets 16.

The internal combustion engine 21, which is a water-cooled 4-cylinder, 4-stroke-cycle internal combustion engine, is mounted on the motorcycle 1 and has a crankshaft 22 (FIG. 2) oriented transversely across the motorcycle 1, i.e., in leftward and rightward directions.

The crankshaft 22 is rotatably supported by the crankcase 23. On the crankcase 23, there are successively stacked a cylinder block 24 and a cylinder head 25 in a substantially upright configuration with the cylinder head 25 being covered with a cylinder head cover 26.

An intake pipe 27 extends upward through a throttle body 27t from the cylinder head 25, which is tilted forward, of the internal combustion engine 21, and is connected to an air cleaner 27A.

An exhaust pipe 28 extends forward from the cylinder head 25, is bent downward, then extends rearward, and is connected to a muffler 28M in a rear section of the motorcycle 1.

Figure 4:
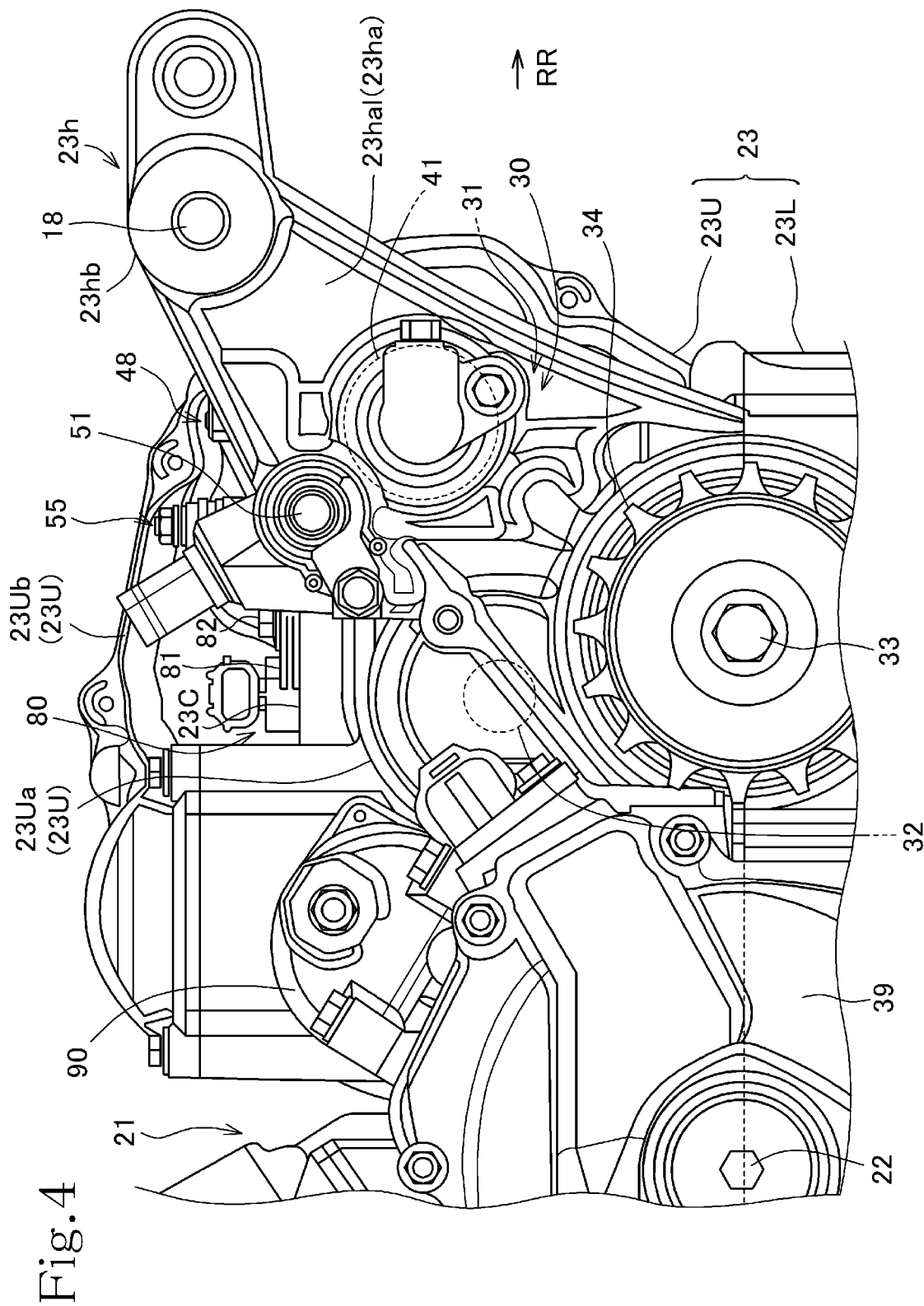
FIG. 4 is a fragmentary side elevational view of a rear portion of the power unit illustrated in FIG. 2.

As illustrated in FIG. 4, the crankcase 23 of the internal combustion engine 21 is made up of an upper crankcase member 23U and a lower crankcase member 23L that are vertically separable from each other. A hanger 23h extends obliquely rearward and upward from an upper rear portion of the upper crankcase member 23U.

Figure 5:
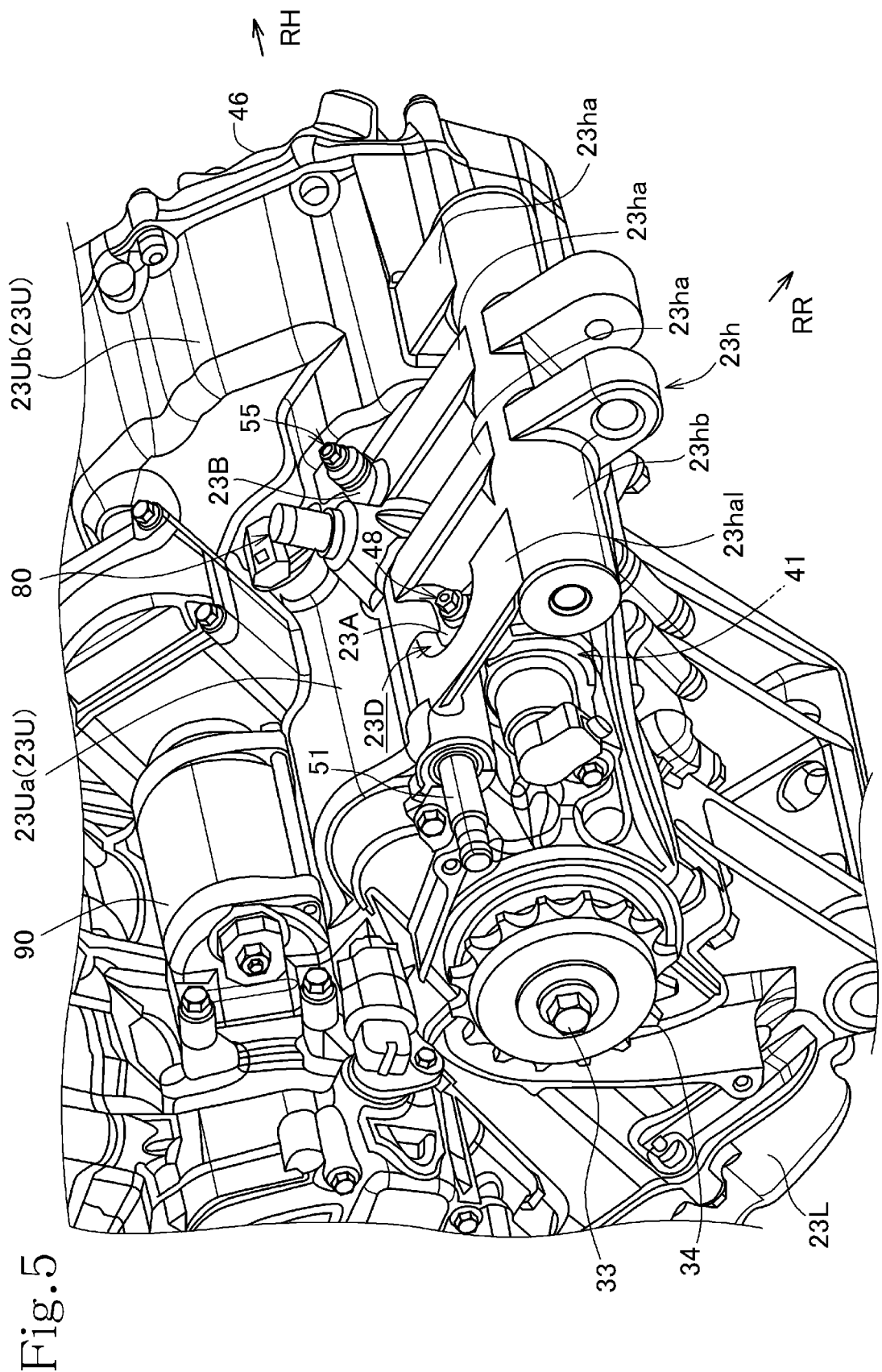
FIG. 5 is a fragmentary perspective view of the rear portion of the power unit illustrated in FIG. 2.

As illustrated in FIGS. 4 and 5, the hanger 23h has four arms 23ha extending obliquely rearward and upward from the upper crankcase member 23U and arrayed in the transverse directions of the motorcycle 1. The four arms 23ha support on their distal ends a hollow cylindrical bearing 23hb extending in the transverse directions of the motorcycle 1, i.e., the leftward and rightward directions thereof.

Figure 2:
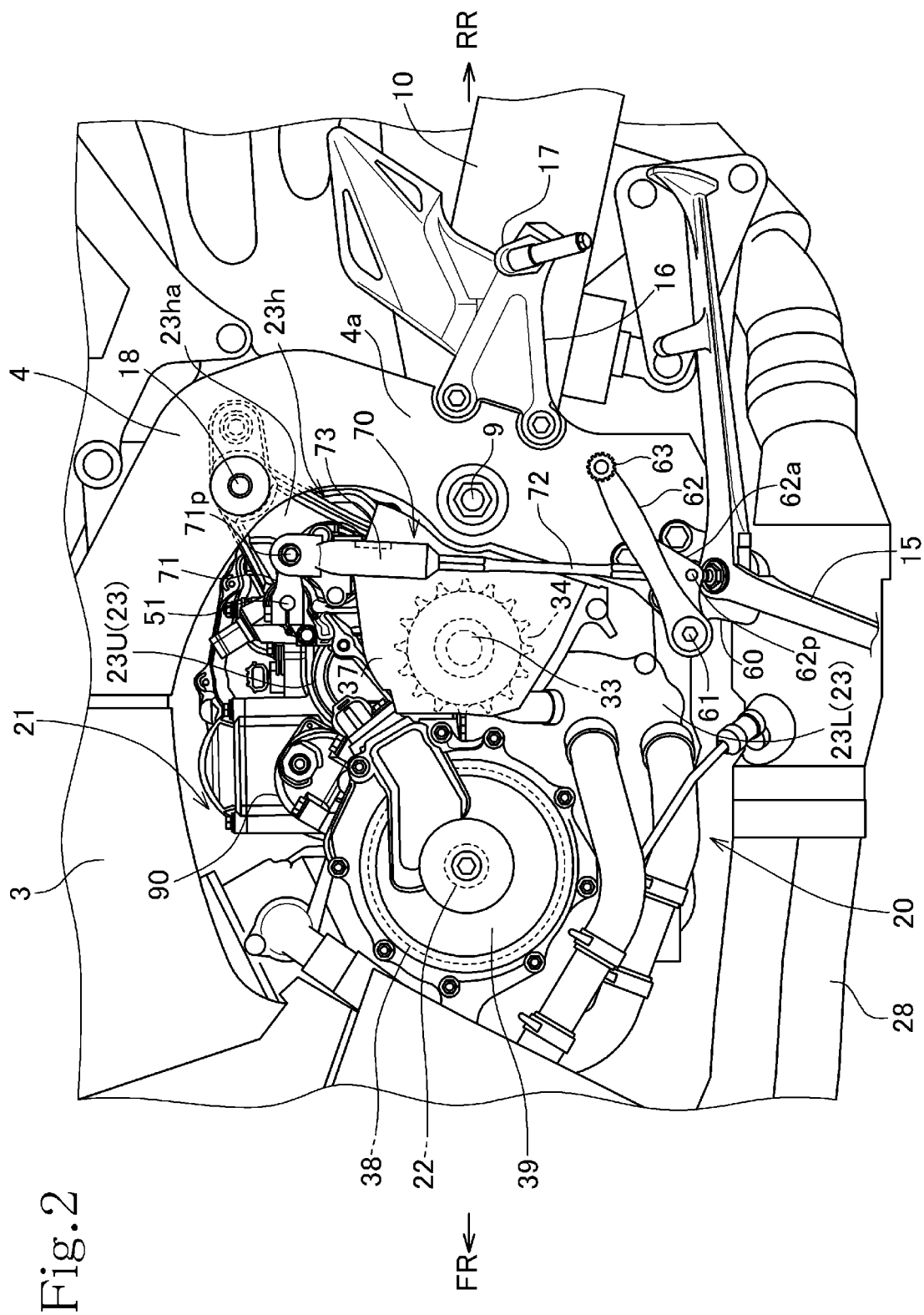
FIG. 2 is a side elevational view of a power unit mounted on the motorcycle illustrated in FIG. 1.

As illustrated in FIG. 2, the hollow cylindrical bearing 23hb of the hanger 23h is disposed between the left and right central frames 4 of the vehicle body frame 2 and supported by a support shaft 18 extending therethrough and supported by the central frames 4, so that the power unit 20 is suspended by the vehicle body frame 2.

As illustrated in FIG. 4, the crankshaft 22 is rotatably supported between and by mating surfaces of left and right bearing walls of the upper crankcase member 23U and the lower crankcase member 23L of the crankcase 23. The transmission 31 has a main shaft 32 and a countershaft 33 that extend in the transverse directions of the motorcycle 1, i.e., the leftward and rightward directions thereof. The countershaft 33 is also rotatably supported between and by the mating surfaces of the left and right bearing walls of the upper crankcase member 23U and the lower crankcase member 23L of the crankcase 23.

The main shaft 32 of the transmission 31 is positioned upward and slightly forward of the countershaft 33, and supported by the upper crankcase member 23U.

Figure 6:
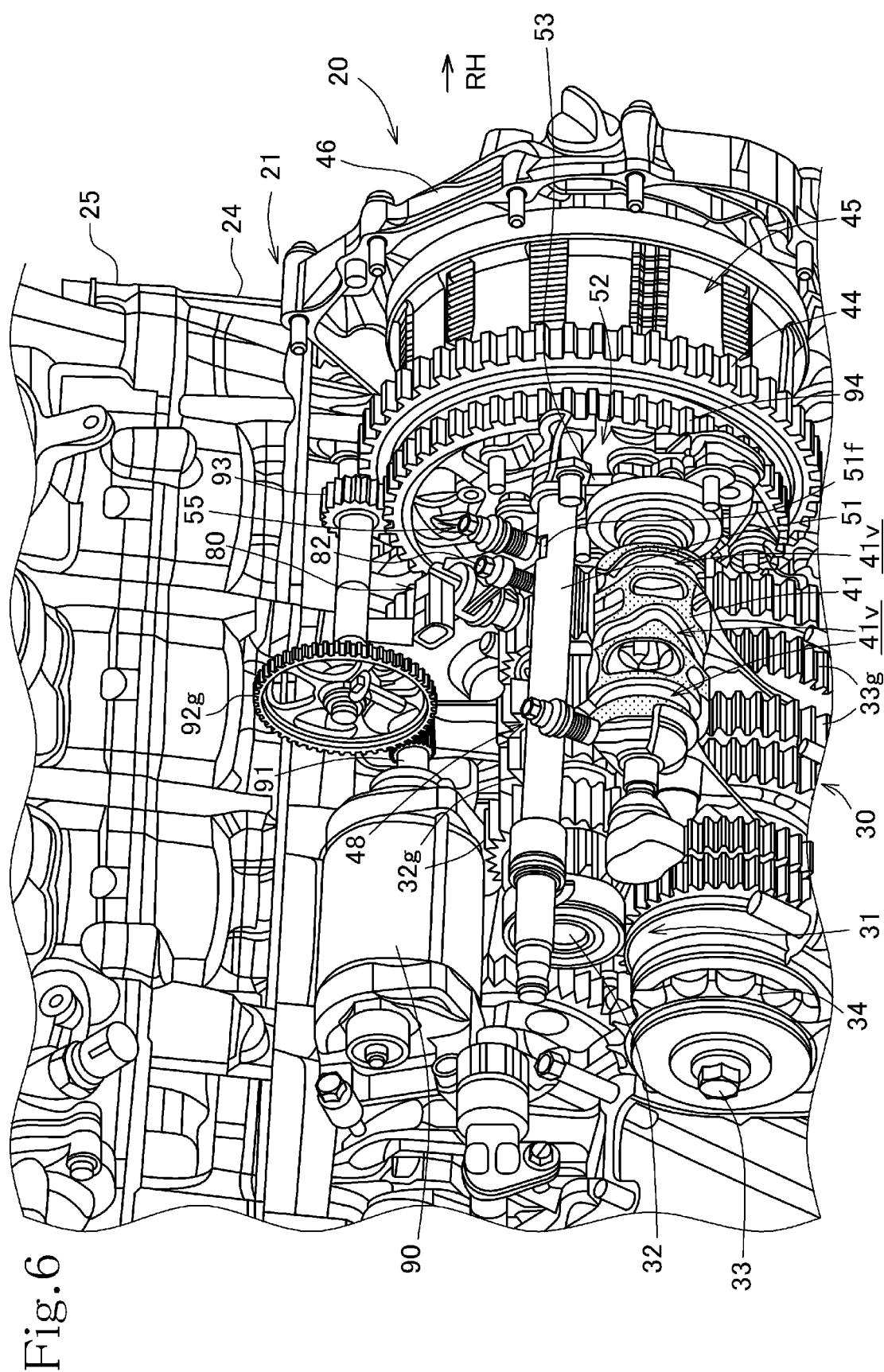
FIG. 6 is a fragmentary perspective view depicting the internal structure of the transmission apparatus in the rear portion of the power unit, with a crankcase omitted from illustration.

As illustrated in FIG. 6, the transmission 31 has a group of transmission drive gears 32g rotatably supported on the main shaft 32 and a group of transmission driven gears 33g supported on the countershaft 33, the drive gears 32g and the driven gears 33g being normally held in mesh with each other in pairs corresponding to respective transmission gear ratios.

The countershaft 33, which is the output shaft of the power unit 20, extends through the left bearing walls and has a projecting left end fitted in an output sprocket 34 that is covered with an output sprocket cover 37 (see FIG. 2) on the left side of the crankcase 23.

As shown in FIG. 2, the output sprocket 34 is disposed at a position forward of and close to the pivot shaft 9 by which the rear fork 10 is supported on the rear fork pivot portions 4a. A drive chain 36 (see FIG. 1) is trained around the output sprocket 34 and a driven sprocket 35 fitted coaxially over the rear axle of the rear wheel 11. The output power from the power unit 20 is transmitted from the output sprocket 34 through the drive chain 36 to the rear wheel 11, propelling the motorcycle 1.

Figure 3:
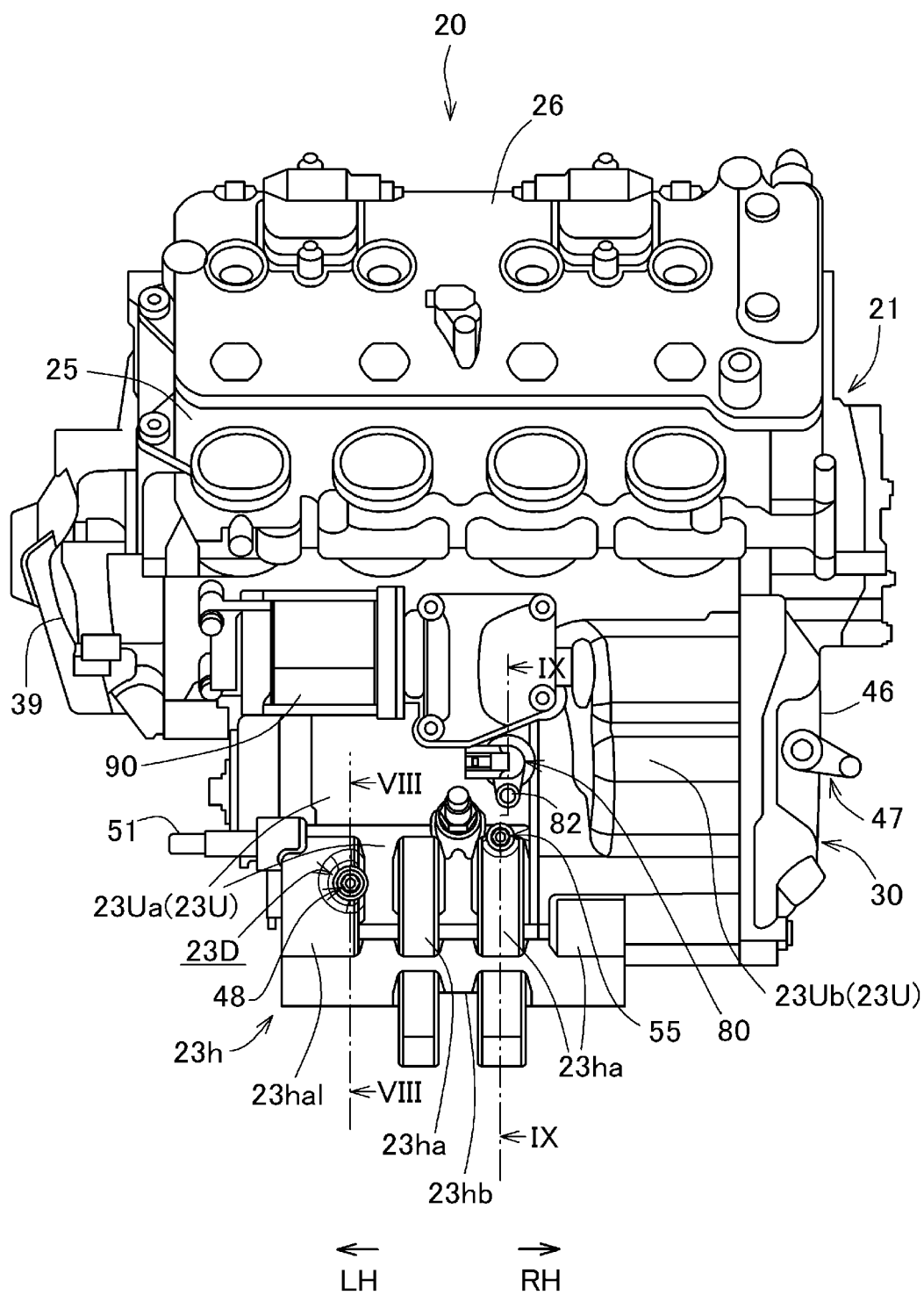
FIG. 3 is a plan view of the power unit illustrated in FIG. 2.

As illustrated in FIG. 3, the group of transmission drive gears 32g and the group of transmission driven gears 33g of the transmission 31 are covered with an upper wall 23Ua of the upper crankcase member 23U disposed thereabove. A rotational speed sensor 80 is mounted on and extends downward through the upper wall 23Ua. The rotational speed sensor 80 is disposed in the vicinity of the rightmost one of the transmission drive gears 32g that rotate in unison with the main shaft 32 (see also FIGS. 6 and 9).

The rotational speed sensor 80 includes a hollow cylindrical sensor body 80a mounted in and extends through a through mount hole defined in a rotational sensor mount seat 23C of the upper wall 23Ua. A lock arm 81 projecting from the sensor body 80a is fastened to the rotational sensor mount seat 23C by a bolt 82 (see FIG. 9).

The rotational speed sensor 80 is a proximity sensor having a detector 80b on its distal end of the sensor body 80a that faces the teeth of the transmission drive gear 32g to detect the rotational speed of the main shaft 32 based on the rotation of the transmission drive gear 32g.

As illustrated in FIGS. 2 and 3, an AC generator 38 is mounted on the left end of the crankshaft 22 that extends through the left bearing walls for the crankshaft 22. The AC generator 38 that projects on the left side of the crankshaft 22 is covered with an ACG cover 39 on the left side of the crankshaft 22.

As illustrated in FIG. 6, a transmission clutch 45 is mounted on the right end of the main shaft 32 that extends through the right bearing walls of the crankcase 23, along a primary driven gear 44 mounted on the main shaft 32. As illustrated in FIGS. 3 and 5, the upper crankcase member 23U includes a clutch housing 23Ub that protrudes upward beyond the upper wall 23Ua covering the transmission 31 and that covers the outer circumference of the transmission clutch 45.

The rotational speed sensor 80 that is mounted on and extends downward through the upper wall 23Ua is disposed on the left side of and along the clutch housing 23Ub protruding upward beyond the upper wall 23Ua.

As illustrated in FIG. 4, the transmission clutch 45 has a right side covered with a clutch cover 46.

As illustrated in FIG. 3, a clutch actuator 47 is mounted on the clutch cover 46 to manually actuate the transmission clutch 45.

As illustrated in FIG. 6, the main shaft 32 and the countershaft 33 are disposed in vertically spaced upper and lower positions behind the crankshaft 22 of the internal combustion engine 21. A shift drum 41 is disposed behind the main shaft 32.

Figure 7:
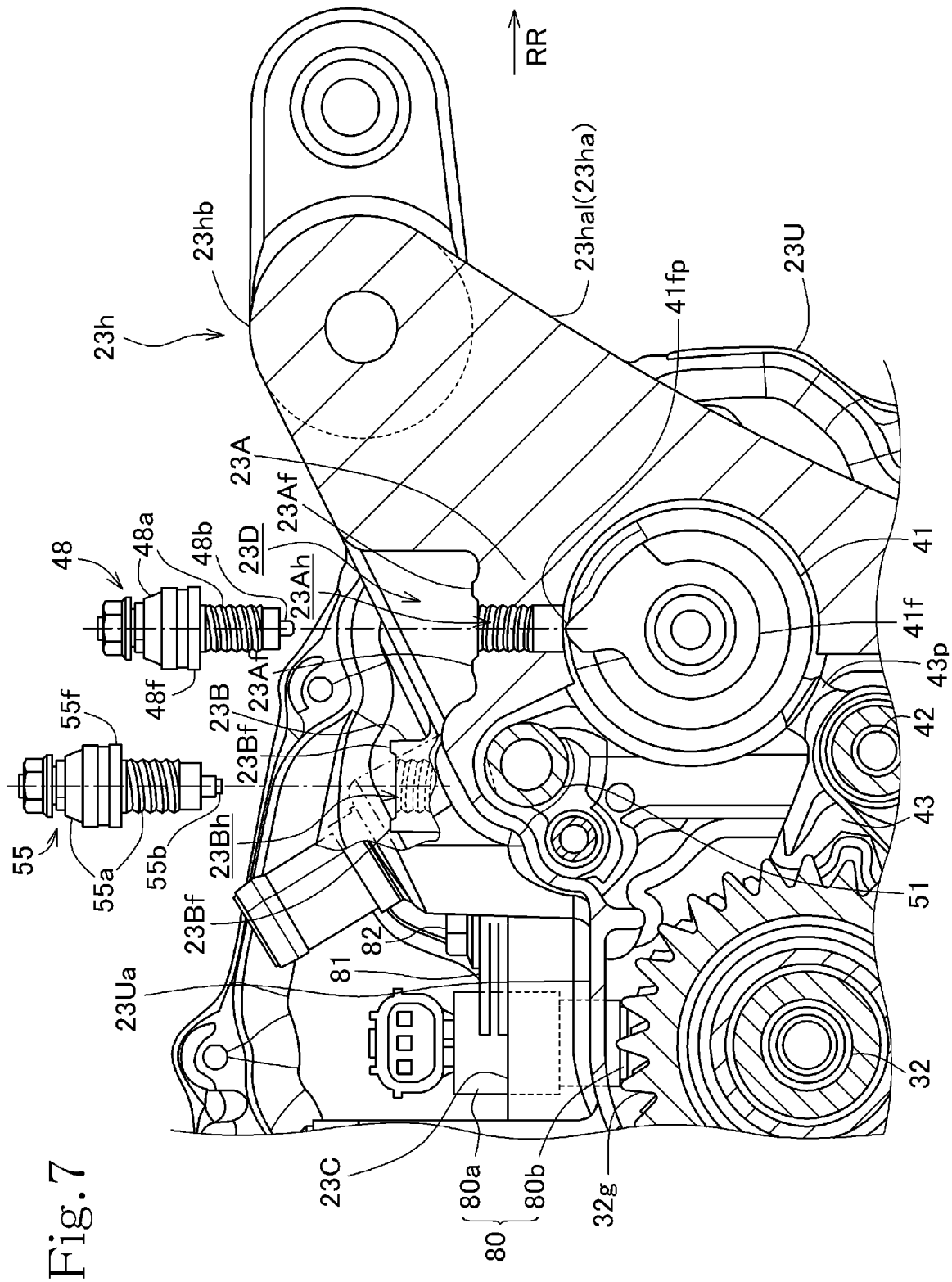
FIG. 7 is a sectional view of the power unit, partly cut away, taken along line VIII-VIII of FIG. 3, immediately prior to the installation of a shift drum sensor and a shift spindle sensor.

As shown in FIG. 7, a shift fork shaft 42 is disposed obliquely forward and downward of the shift drum 41 and between the group of transmission driven gears 33g and the shift drum 41. The shift fork shaft 42 extends parallel to the main shaft 32 and the countershaft 33. A shift fork 43 is rotatably supported on the shift fork shaft 42 and is slidable on and along the shift fork shaft 42 in the leftward and rightward directions.

Figure 8:
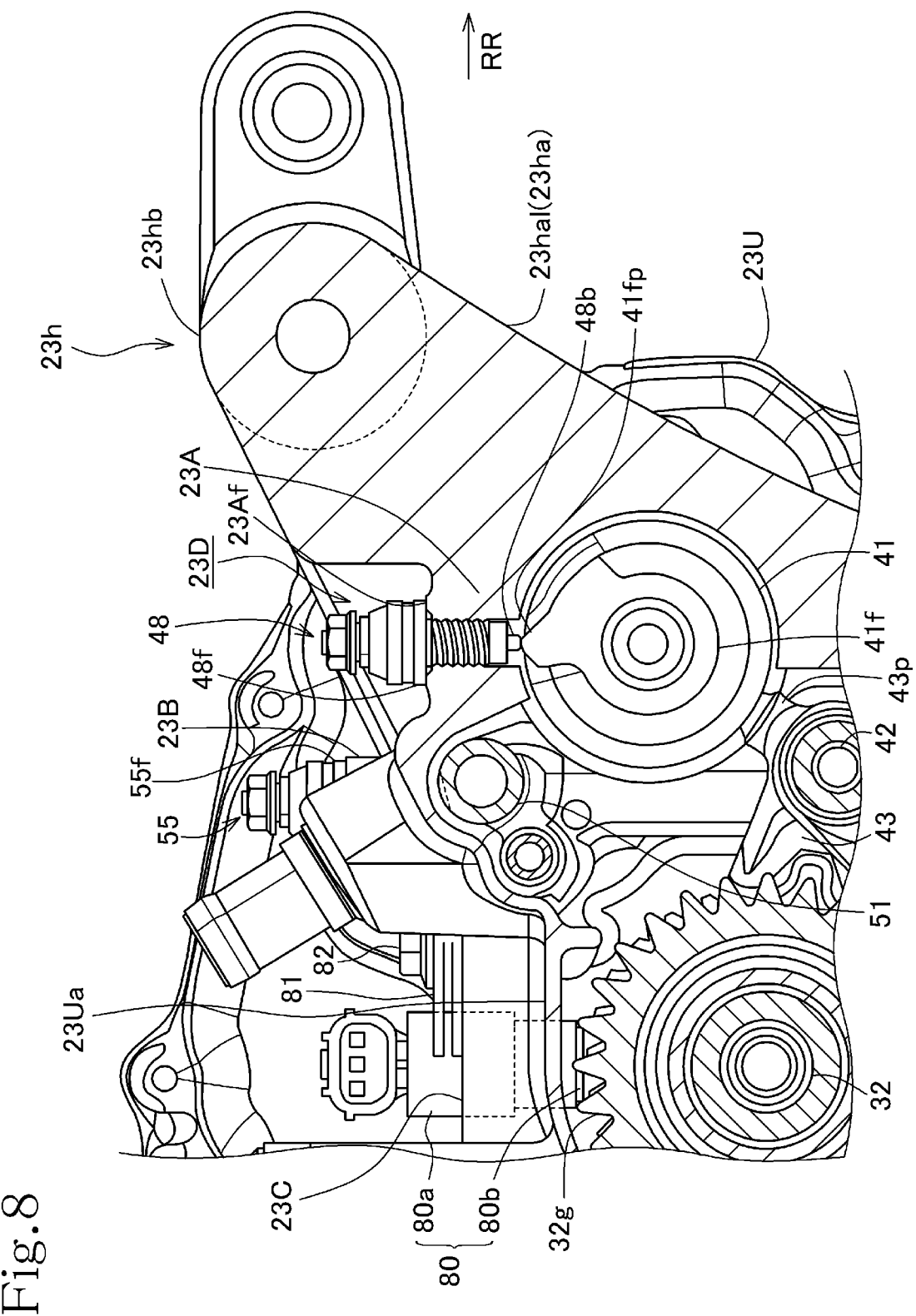
FIG. 8 is a sectional view of the power unit taken along line VIII-VIII of FIG. 3.

As illustrated in FIGS. 6 through 8, the shift fork 43 has an engagement pin 43p slidably engaging in a lead groove 41v defined in the shift drum 41 and a bifurcated fork member engaging shifter gears slidably supported on the main shaft 32 and the countershaft 33.

When the shift drum 41 is turned about its own axis, the shift fork 43 is axially moved by the engagement pin 43p guided by the lead groove 41v defined in the shift drum 41, moving the shifter gears to bring dog clutches thereon into mesh with each other to make effective the meshing of a pair of transmission gear pair on the main shaft 32 and the countershaft 33, thereby establishing a corresponding transmission gear position.

The shift drum 41 includes a hollow cylindrical body having a rotational central axis extending in the leftward and rightward directions. The hollow cylindrical body of the shift drum 41 has on its left end in the leftward and rightward directions a detectable surface 41f (see FIG. 7) that can be detected by a shift drum sensor 48. The detectable surface 41f is basically a circumferentially extending cylindrical surface.

The shift drum sensor 48 corresponds to a neutral switch for detecting a neutral position of the transmission apparatus 30, in particular, in an angular displacement of the shift drum 41.

The detectable surface 41f of the shift drum 41 includes a projection tip 41fp that projects radially outward from the circumferential surface of the detectable surface 41f. When the shift drum 41 is rotationally moved to bring the transmission apparatus 30 into the neutral position, the projection tip 41fp is positioned to be directed upward.

As illustrated in FIGS. 5 and 7, the shift drum sensor 48 is mounted on the upper wall 23Ua of the upper crankcase member 23U that covers the shift drum 41 from above, and is positioned above the detectable surface 41f on the left end of the shift drum 41.

As shown in FIGS. 7 and 8, the upper wall 23Ua of the upper crankcase member 23U has its portion above the detectable surface 41f on the left end of the shift drum 41 adjacent to a proximal end portion of the leftmost one 23ha1 of the four arms 23ha of the hanger 23h that extends obliquely rearward and upward from the upper wall 23Ua. The proximal end portion of the arm 23ha1 has a recess 23D defined therein that is concave downward and inward from above and a drum sensor mount seat 23A on the bottom wall of the recess 23D. The drum sensor mount seat 23A has a through drum sensor mount hole 23Ah defined therein that extends substantially vertically therethrough.

The through drum sensor mount hole 23Ah has an internally threaded inner circumferential surface.

The through drum sensor mount hole 23Ah that extends substantially vertically through the drum sensor mount seat 23A has an upper opening surrounded by a substantially horizontal upper end face that serves as a drum sensor mount seat face 23Af of the drum sensor mount seat 23A.

As illustrated in FIGS. 5 and 7, the shift drum sensor 48 is mounted on the drum sensor mount seat 23A at the bottom wall of the recess 23D defined in the proximal end portion of the leftmost arm 23ha1 of the hanger 23h that extends from the upper wall 23Ua of the upper crankcase member 23U.

The shift drum sensor 48 is a limit switch having a drum sensor actuator 48b that is normally biased by a spring to project downward from the distal end of a hollow cylindrical drum sensor body 48a. The shift drum sensor 48 is selectively turned on and off in response to advanced and retracted movement of the drum sensor actuator 48b.

As illustrated in FIG. 7, the shift drum sensor 48 includes an enlarged-diameter flange 48f on the drum sensor body 48a. A portion of the drum sensor body 48a which is closer to the proximal end, i.e., the upper end, of the shift drum sensor 48 than the enlarged-diameter flange 48f is connected to a harness, whereas a portion of the drum sensor body 48a which is closer to the distal end, i.e., the lower end, of the shift drum sensor 48 than the enlarged-diameter flange 48f has an externally threaded outer circumferential surface.

The shift drum sensor 48 is mounted in place on the drum sensor mount seat 23A when the externally threaded outer circumferential surface of the portion of the drum sensor body 48a which is closer to the distal end of the shift drum sensor 48 than the enlarged-diameter flange 48f is threaded downward into the internally threaded inner circumferential surface of the through drum sensor mount hole 23Ah defined in the drum sensor mount seat 23A, and the enlarged-diameter flange 48f is held against the substantially horizontal drum sensor mount seat face 23Af of the drum sensor mount seat 23A.

With the shift drum sensor 48 mounted on the drum sensor mount seat 23A, the portion of the drum sensor body 48a which is closer to the proximal end of the shift drum sensor 48 than the enlarged-diameter flange 48f is disposed outside of the through drum sensor mount hole 23Ah and is almost entirety housed in the recess 23D, whereas the portion of the drum sensor body 48a which is closer to the distal end of the shift drum sensor 48 than the enlarged-diameter flange 48f is mounted in and extends through the through drum sensor mount hole 23Ah. The drum sensor actuator 48b normally biased to project downward from the drum sensor body 48a is held in contact with the detectable surface 41f on the left end of the shift drum 41 (see FIG. 8).

FIG. 8 depicts the positions of the parts when the transmission apparatus 30 is in the neutral position. At this time, the projection tip 41fp of the detectable surface 41f of the shift drum 41 is in an upper position, to thereby upwardly retract the drum sensor actuator 48b of the shift drum sensor 48 that is held against the projection tip 41fp to turn on the shift drum sensor 48.

As the shift drum 41 is turned to bring the transmission apparatus 30 out of the neutral position, the projection tip 41fp of the detectable surface 41f is angularly moved out of engagement with the drum sensor actuator 48b of the shift drum sensor 48, which moves downward to turn off the shift drum sensor 48.

In this manner, the shift drum sensor 48 can detect the neutral position when the shift drum 41 and hence the transmission apparatus 30 are in the neutral position, to distinguish from the non-neutral position.

As shown in FIG. 8, shift spindle 51 that is oriented transversely across the motorcycle 1, i.e., in leftward and rightward directions, is rotatably supported in the crankcase 23 obliquely forward and upward of the shift drum 41.

The shift spindle 51 and the shift drum 41 have respective rotational central axes extending parallel to each other and are staggered horizontally with respect to each other such that they are kept out of vertical alignment with each other.

The shift spindle 51 has an upper portion covered with the upper wall 23Ua of the upper crankcase member 23U.

As illustrated in FIG. 6, a ratchet arm 53 is fitted over the right end of the shift spindle 51. A shift drum actuating mechanism 52 for transmitting power to intermittently turn the shift drum 41 is provided between the ratchet arm 53 and the right end of the shift drum 41.

The shift spindle 51 has a flat detectable surface 51f formed as a recess in an arcuate surface that is part of a circular outer circumferential surface of the shift spindle 51 and lying parallel to a plane including the central axis of the shift spindle 51. The flat detectable surface 51f is at a position near the right end of the shift spindle 51 over which the ratchet arm 53 of the shift drum actuating mechanism 52 is fitted on the output side, i.e., the right side, of the shift spindle 51.

Figure 9:
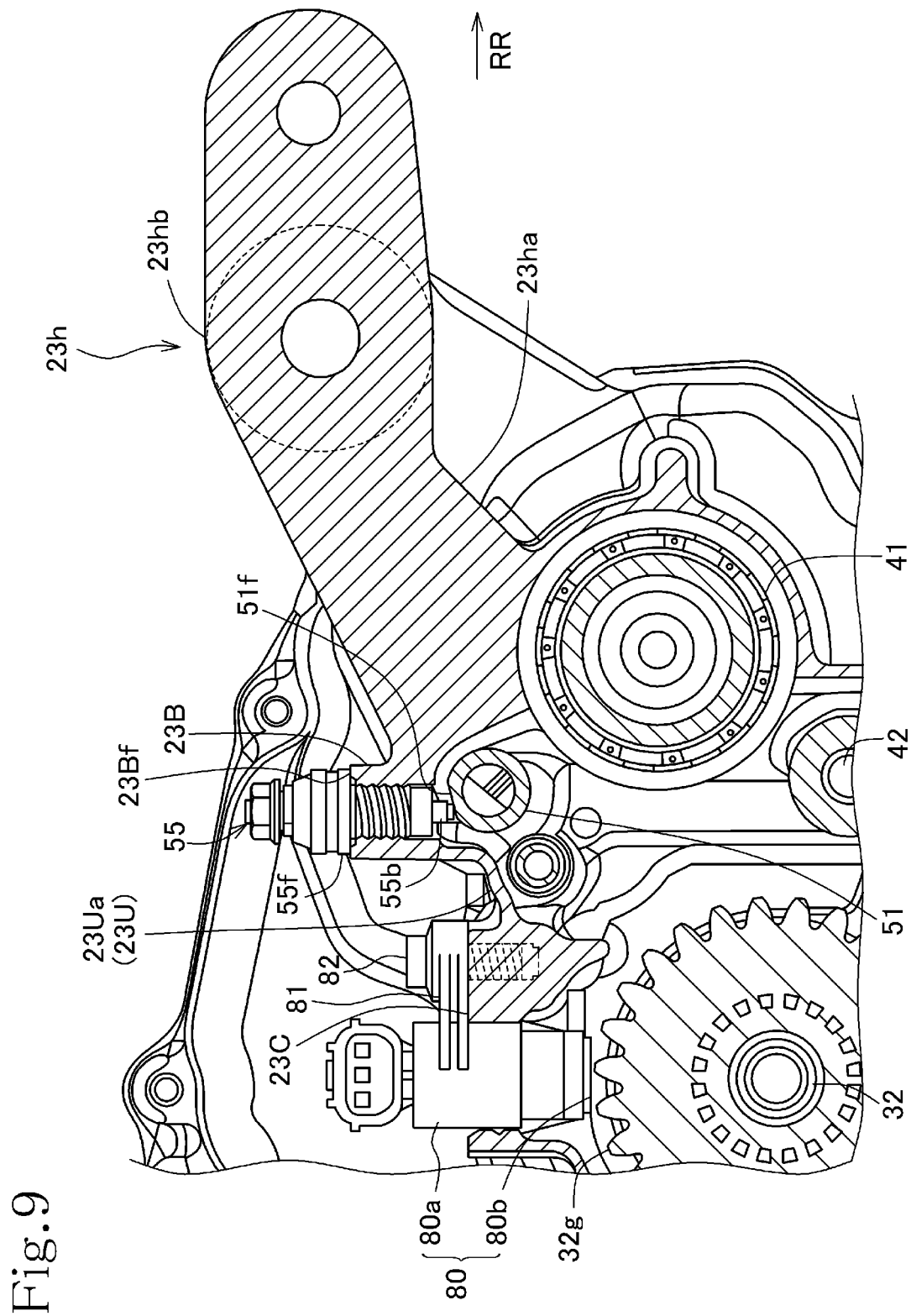
FIG. 9 is a sectional view of the power unit taken along line IX-IX of FIG. 3.

As illustrated in FIGS. 3 and 5, a shift spindle sensor 55 is mounted on and extends downward through the upper wall 23Ua of the upper crankcase member 23U that overlies the shift spindle 51 at a position on the left side of and along the clutch housing 23Ub that protrudes upward beyond the upper wall 23Ua. As illustrated in FIGS. 6 and 9, the detectable surface 51f of the shift spindle 51 is positioned directly below the shift spindle sensor 55.

As illustrated in FIGS. 7 and 9, the upper wall 23Ua of the upper crankcase member 23U has a spindle sensor mount seat 23B above the detectable surface 51f in the vicinity of the right end of the shift spindle 51. The spindle sensor mount seat 23B has a through spindle sensor mount hole 23Bh defined therein that extends substantially vertically therethrough.

The through spindle sensor mount hole 23Bh has an internally threaded inner circumferential surface.

The through spindle sensor mount hole 23Bh that extends substantially vertically through the spindle sensor mount seat 23B has an upper opening surrounded by a substantially horizontal upper end face that serves as a spindle sensor mount seat face 23Bf of the spindle sensor mount seat 23B.

As the shift drum sensor 48, the shift spindle sensor 55 is a limit switch having a spindle sensor actuator 55b that is normally biased by a spring to project downward from the distal end of a hollow cylindrical spindle sensor body 55a. The shift spindle sensor 55 is selectively turned on and off in response to advancing and retracting movement of the spindle sensor actuator 55b.

As FIG. 7 shows, the shift spindle sensor 55 includes an enlarged-diameter flange 55f on the spindle sensor body 55a. A portion of the spindle sensor body 55a which is closer to the proximal end, i.e., the upper end, of the shift spindle sensor 55 than the enlarged-diameter flange 55f is connected to a harness, whereas a portion of the spindle sensor body 55a which is closer to the distal end, i.e., the lower end, of the shift spindle sensor 55 than the enlarged-diameter flange 55f has an externally threaded outer circumferential surface.

The shift spindle sensor 55 is mounted in place on the spindle sensor mount seat 23B when the externally threaded outer circumferential surface of the portion of the spindle sensor body 55a which is closer to the distal end of the shift spindle sensor 55 than the enlarged-diameter flange 55f is threaded downward into the internally threaded inner circumferential surface of the through spindle sensor mount hole 23Bh defined in the spindle sensor mount seat 23B, and the enlarged-diameter flange 55f is held against the substantially horizontal spindle sensor mount seat face 23Bf of the spindle sensor mount seat 23B.

As illustrated in FIG. 9, with the shift spindle sensor 55 mounted on the spindle sensor mount seat 23B, the portion of the spindle sensor body 55a, which is closer to the proximal end of the shift spindle sensor 55 than the enlarged-diameter flange 55f, is exposed outwardly, while the portion of the spindle sensor body 55a, which is closer to the distal end of the shift spindle sensor 55 than the enlarged-diameter flange 55f, is mounted in and extends through the through spindle sensor mount hole 23Bh of the spindle sensor mount seat 23B. The spindle sensor actuator 55b normally biased to project downward from the spindle sensor body 55a is held in contact with the detectable surface 51f near the left end of the shift spindle 51.

The spindle sensor actuator 55b that can be vertically advanced and retracted in the shift spindle sensor 55 is slightly displaced forward from the rotational central axis of the shift spindle 51 that is oriented horizontally in the leftward and rightward directions.

FIG. 9 illustrates the positions of the parts when the shift spindle 51 is not turned, i.e., is in its normal position. At this time, the spindle sensor actuator 55b of the shift spindle sensor 55 projects in contact with a central area of the flat detectable surface 51f that is inclined, and is advanced to turn on the shift spindle sensor 55.

When the shift spindle 51 is turned about its own axis counterclockwise as viewed in FIG. 9, the spindle sensor actuator 55b slides against the turning detectable surface 51f and is pushed back or retracted by the turning detectable surface 51f, turning off the shift spindle sensor 55. The shift spindle sensor 55 can thus detect turning movement of the shift spindle 51 when the shift spindle 51 is turned.

The shift spindle 51 is turned about its own axis through a small angular range. As the vertically movable spindle sensor actuator 55b of the shift spindle sensor 55 is slightly displaced forward from the rotational central axis of the shift spindle 51, the distance by which the spindle sensor actuator 55b is vertically movable is maximized to increase the accuracy with which the shift spindle sensor 55 detects turning movement of the shift spindle 51.

The shift spindle 51 extends leftward through the crankcase 23 and has a left end portion projecting out of the crankcase 23.

As illustrated in FIG. 2, a support bracket 60 is fixed to the lower end of the left central frame 4 below the projecting left end portion of the shift spindle 51. A shift lever 62 has its front end pivotally supported on a shift support shaft 61 projecting from the support bracket 60 and extends rearward from the shift support shaft 61.

A shift pedal 63 projects leftward from the rear end of the shift lever 62. The shift pedal 63 on the shift lever 62 is thus swingable about the shift support shaft 61.

The shift lever 62 is positioned below the left end of the shift spindle 51 and is operatively coupled to the shift spindle 51 by a link mechanism 70.

Specifically, as illustrated in FIG. 2, the link mechanism 70 includes a substantially vertical shift rod 72 that interconnects the shift lever 62 and a shift arm 71 fitted over the left end portion of the shift spindle 51 that projects leftward out of the crankcase 23.

As illustrated in FIG. 2, the shift rod 72 has a lower end pivotally connected by a joint pin 62p to a support web 62a projecting downward from the shift lever 62 at a position displaced toward the shift support shaft 61 from the center of the shift lever 62. The shift rod 72 has its upper end pivotally connected by a joint pin 71p to the rear end of the shift arm 71 whose front end is fitted over the left end portion of the shift spindle 51.

The shift rod 72 includes a lost-motion mechanism 73 for transmitting shifting forces from the shift lever 62 through a resilient member incorporated therein.

The lost-motion mechanism 73 serves to absorb impacts due to engagement of the dogs of the dog clutches of the transmission 31, thereby giving the rider on the motorcycle 1 a smooth gear shift feeling.

As illustrated in FIG. 2, a back step 17 projects from the support bracket 16 on the left central frame 4 behind the shift pedal 63 on the rear end of the shift lever 62 at a position slightly higher than the shift pedal 63. When the rider who is seated on the seat 14 places its left foot on the back step 17 and raises the shift pedal 63 with the big toe placed therebeneath, the shift lever 62 swings upward about the shift support shaft 61, shifting up the transmission 31. When the rider lowers the shift pedal 63 with the big toe placed thereon, the shift lever 62 swings downward about the shift support shaft 61, shifting down the transmission 31.

Specifically, during the shifting up of the transmission 31, the shift lever 62 is swung upward, pushing up the shift rod 72 pivotally coupled to the shift lever 62 by the joint pin 62p. The shift arm 71 is now swung upward by the joint pin 71p, turning the shift spindle 51 counterclockwise as viewed in left side elevation as illustrated in FIG. 2.

During the shifting down of the transmission 31, the shift lever 62 is swung downward, pulling down the shift rod 72 pivotally coupled to the shift lever 62 by the joint pin 62p. The shift arm 71 is now swung downward by the joint pin 71p, turning the shift spindle 51 clockwise as viewed in left side elevation as illustrated in FIG. 2.

As described above, the shift drum actuating mechanism 52 angularly moves the shift spindle 51 to change between transmission gear positions of the transmission 51.

As illustrated in FIG. 6, the detectable surface 51f is positioned closely to the ratchet arm 53 on the output side, i.e., the right side, of the shift spindle 51 in view of torsions of the shift spindle 51, whereby the shift spindle sensor 55 can accurately detect angular movement of the shift spindle 51 on the side of the shift drum actuating mechanism 52, i.e., the establishment of a transmission gear position.

When the shift drum sensor 48 detects that the shift drum 41 is in the neutral position and the shift spindle sensor 55 detects that the shift spindle 51 is in the neutral position, the transmission 31 is reliably detected as being in the neutral position.

The rotational speed sensor 80 that is disposed in the vicinity of the rightmost one of the transmission drive gears 32g that rotate in unison with the main shaft 32 is located close to the shift spindle sensor 55 disposed above the detectable surface 51f positioned near the right end of the shift spindle 51.

As shown in FIG. 7, the upper wall 23Ua of the upper crankcase member 23U that covers the shift drum 41 and the shift spindle 51 from above has the drum sensor mount seat 23A on which the shift drum sensor 48 is mounted and the spindle sensor mount seat 23B on which the shift spindle sensor 55 is mounted. As illustrated, the direction in which the shift drum sensor 48 is threaded and mounted in and extends through the through drum sensor mount hole 23Ah defined substantially vertically in the drum sensor mount seat 23A, i.e., a central axis direction of the through drum sensor mount hole 23Ah, is the same as the direction in which the shift spindle sensor 55 is threaded and mounted in and extends through the through spindle sensor mount hole 23Bh defined substantially vertically in the spindle sensor mount seat 23B, i.e., a central axis direction of the through spindle sensor mount hole 23Bh.

As illustrated in FIGS. 7 and 8, the directions in which the drum sensor actuator 48B of the shift drum sensor 48 mounted on the drum sensor mount seat 23A are advanced and retracted, and the directions in which the spindle sensor actuator 55b of the shift spindle sensor 55 mounted on the spindle sensor mount seat 23B are advanced and retracted are substantially vertical directions and parallel to each other.

As illustrated in FIGS. 3 through 5, a starter motor 90 is disposed on a left portion of the upper crankcase member 23U obliquely rearward and upward of the crankshaft 22. As illustrated in FIG. 6, the starter motor 90 has its drive shaft 91 projecting rightward and inserted in the crankcase 23. The drive shaft 91 has a pinion held in mesh with an enlarged-diameter gear 92g that is integrally coaxial with a small-diameter gear 93 held in mesh with a starter driven gear 94 that is rotatably supported on the main shaft 32 through a one-way clutch, whereby a starter mechanism is made up.

The transmission apparatus 30 described in detail above according to the first embodiment of the present invention offers the following advantages:

As illustrated in FIG. 7, the direction in which the shift spindle sensor 55 is mounted in and extends through the through spindle sensor mount hole 23Bh in the spindle sensor mount seat 23B is the same as the direction in which the shift drum sensor 48 is mounted in and extends through the through drum sensor mount hole 23Ah in the drum sensor mount seat 23A, so that the shift spindle sensor 55 and the shift drum sensor 48 can be installed on and removed from the upper crankcase member 23U on one external side or the same external side thereof. Therefore, the shift spindle sensor 55 and the shift drum sensor 48 can be installed and removed with ease and can be serviced for excellent maintainability.

Furthermore, as the through spindle sensor mount hole 23Bh and the through drum sensor mount hole 23Ah are oriented in the same directions, the spindle sensor mount seat 23B and the drum sensor mount seat 23A can be machined in the same direction with ease and hence have excellent machinability.

Specifically, the internally threaded inner circumferential surface of the through spindle sensor mount hole 23Bh in the spindle sensor mount seat 23B and the spindle sensor mount seat face 23Bf thereof, and the internally threaded inner circumferential surface of the through drum sensor mount hole 23Ah in the drum sensor mount seat 23A and the drum sensor mount seat face 23Af thereof can easily be machined.

As illustrated in FIGS. 7 through 9, inasmuch as the directions in which the spindle sensor actuator 55b of the shift spindle sensor 55 is advanced and retracted, and the directions in which the drum sensor actuator 48b of the shift drum sensor 48 is advanced and retracted are the same as each other, accelerations due to the vibrations of the power unit 20 act equally on the spindle sensor actuator 55b and the drum sensor actuator 48b, and any differences due to disturbances between timings at which the shift spindle sensor 55 and the shift drum sensor 48 detect operating states, particularly the neutral position, of the transmission apparatus 30 are minimized.

As illustrated in FIGS. 3 through 5, since the spindle sensor mount seat 23B and the drum sensor mount seat 23A are formed in the upper wall 23Ua of the crankcase 23 that covers the shift spindle 51 and the shift drum 41 from above, the shift spindle sensor 55 mounted on and extending through the spindle sensor mount seat 23B and the shift drum sensor 48 mounted on and extending through the drum sensor mount seat 23A are protected by the crankcase 23 from pebbles or the like flipped up from the ground.

As illustrated in FIGS. 5 and 8, because the drum sensor mount seat 23A is disposed on the bottom wall of the recess 23D defined in the upper wall 23Ua of the upper crankcase member 23U and extending inward from an outer surface of the upper wall 23Ua, the shift drum sensor 48 mounted on the drum sensor mount seat 23A on the bottom wall of the recess 23D has its portion extending from the flange 48f, disposed inward of the upper wall 23Ua, and its portion including the flange 48f, housed in the recess 23D, so that the shift drum sensor 48 is protected from pebbles or the like flipped up from the ground.

As illustrated in FIGS. 5 and 7, because the shift drum sensor 48 is mounted on the drum sensor mount seat 23A on the bottom wall of the recess 23D defined in the projecting hanger 23h of the upper crankcase member 23U, most of the proximal end portion of the drum sensor body 48a that is exposed outward is housed in the recess 23D in the hanger 23h, and is reliably protected by the hanger 23h from pebbles or the like flipped up from the ground and easily kept out of interference with other devices.

As illustrated in FIG. 5, inasmuch as the rotational speed sensor 80 is mounted on the upper crankcase member 23U at a position closer to the shift spindle sensor 55 than to the shift drum sensor 48, the rotational speed sensor 80 and the shift spindle sensor 55 are put closely together, creating a space on the upper crankcase member 23U that can effectively be used to place other devices therein.

As illustrated in FIGS. 5 and 6, since the shift drum sensor 48 is mounted on a portion of the upper crankcase member 23U near the left end of the shift drum 41 along the rotational axis directions thereof, and the rotational speed sensor 80 is mounted on a portion of the upper crankcase member 23U near the right end of the shift drum 41 along the rotational axis directions thereof, the shift drum sensor 48 and the rotational speed sensor 80 are spaced from each other in the leftward and rightward directions on the respective portions of the upper crankcase member 23U on both ends of the shift drum 41 along the rotational axis directions thereof. Therefore, there is a large space available on the upper crankcase member 23U between the shift drum sensor 48 and the rotational speed sensor 80 for effective use as a space to place other devices therein.

A transmission apparatus according to a second embodiment of the present invention will be described with reference to FIGS. 10 to 21. The power unit including the transmission apparatus according to a second embodiment and the motorcycle with the power unit mounted thereon are substantially the same as the power unit 20 and the motorcycle 1 in the first embodiment. Therefore, the same reference signs as in the first embodiment will be used in the description of the second embodiment.

Figure 10:
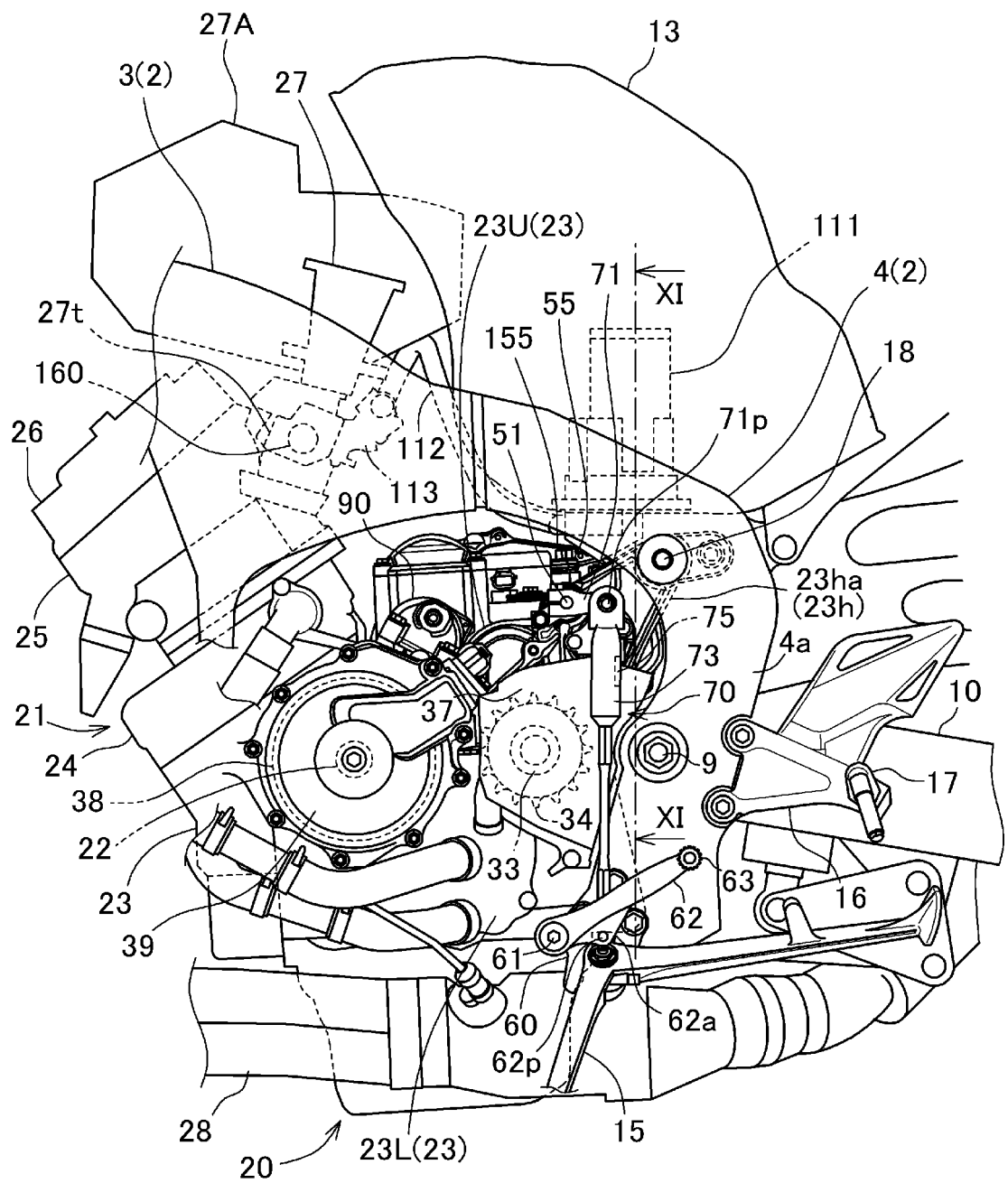
FIG. 10 is a side elevational view of a motorcycle mounted thereon with a transmission apparatus according to a second embodiment of the present invention.

As shown in FIG. 10, the power unit 20 includes an internal combustion engine 21 and the transmission apparatus 30 at the front and rear, and a fuel tank 13 is mounted on the transmission apparatus 30 at the rear of the power unit 20.

Figure 11:
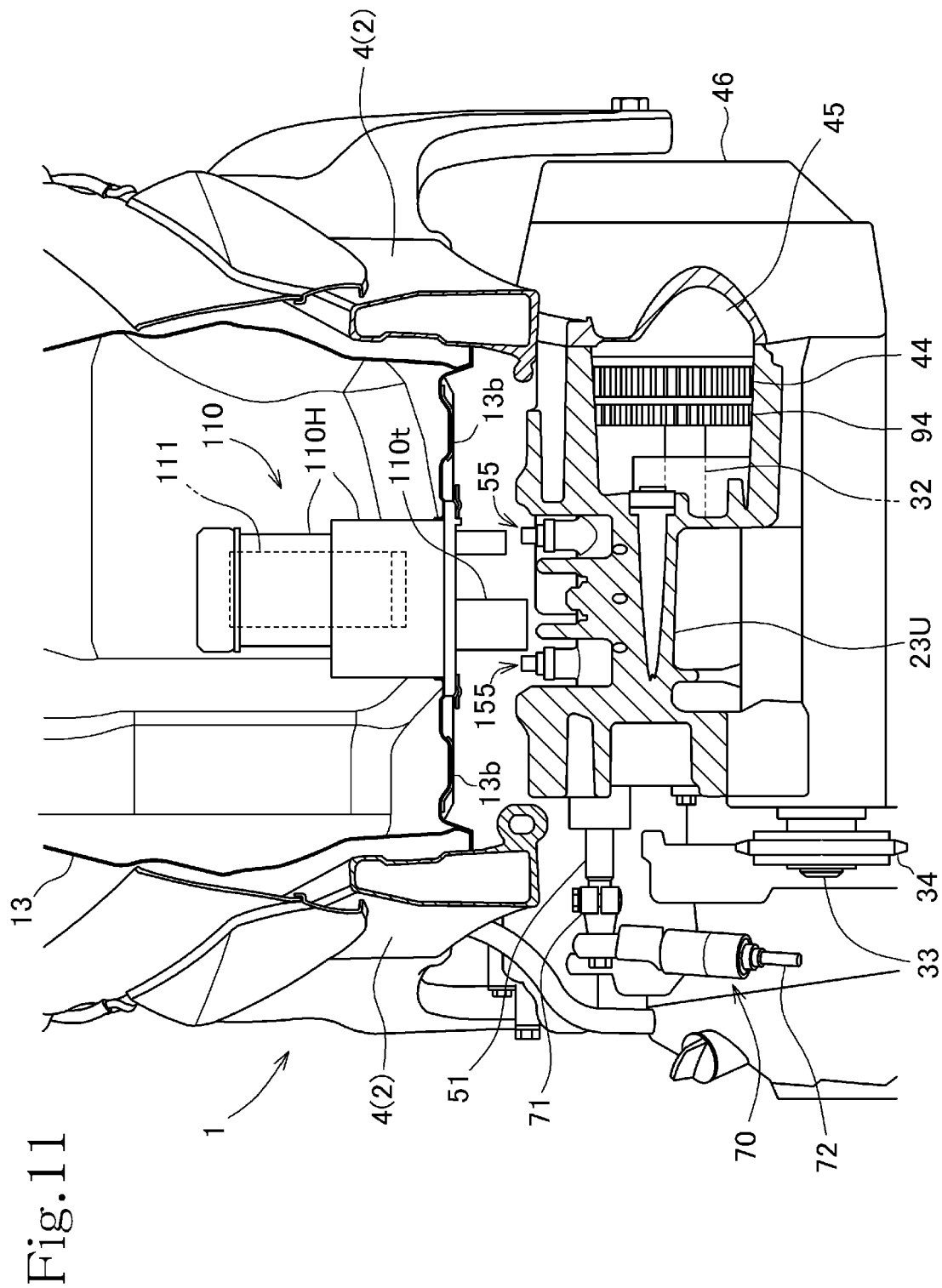
FIG. 11 is a sectional view showing a principal portion of the motorcycle, taken along line XI-XI of FIG. 10.

With reference to FIGS. 10 and 11, the fuel tank 13 is supported with its lower portion located between left and right center frames 4. Between the fuel tank 13 and a cylinder head 25 (and a cylinder head cover 26) in front of the fuel tank 13 are disposed a suction pipe 27 and an air cleaner 27A.

An upper crankcase member 23U of a crankcase 23 has its upper wall portion 23Ua (see FIG. 12) covering a group of transmission drive gears 32g and a group of transmission driven gears 33g of the transmission 31. As shown in FIG. 11, a bottom plate 13b of the fuel tank 13 covers the upper wall portion 23Ua from above.

As FIG. 11 shows, the bottom plate 13b of the fuel tank 13 is at a height level at which the left and right center frames 4 extend.

On the bottom plate 13b is fixedly supported a fuel pump unit 110 at an intermediate position of the crankcase 23 in the vehicle width direction (approximately a central position with respect to the vehicle width)

The fuel pump unit 110 has a fuel pump 111 and a cylindrical unit main body 110H provided therein with a fuel passage (not shown) with a fuel pressure adjusting device. The fuel pump 111 and the cylindrical unit main body 110H are disposed above the bottom plate 13b and within the fuel tank 13. The fuel pump unit 110 has a fuel delivery portion 110t projecting downward from the unit main body 110H out of the fuel tank 13 and below the bottom plate 13b.

A space defined between the upper wall portion 23Ua of the upper crankcase member 23U and the bottom plate 23b of the fuel tank 13 is narrow. Therefore, the fuel delivery portion 110t of the fuel pump unit 110 projecting downward from the bottom plate 13b, and a fuel supply hose 112 (see FIG. 10) are located close to the upper wall portion 23Ua of the upper crankcase member 23U.

The fuel pump 111 of the fuel pump unit 110 operates to suck fuel in the fuel tank 13 by way of an area on the bottom plate 23b, and fuel supplied from the fuel pump 111 is sent by way of a fuel supply passage into the fuel delivery portion 110t. The fuel is then caused to flow through the fuel supply hose 112 to a fuel injection valve 113 (see FIG. 10) provided in the intake system of the engine 21.

In the transmission apparatus according to the present embodiment operates as follows. By operating a shift lever 62, a shift spindle 51 is subjected to rotary displacement by way of a link mechanism 70. Then, the rotary displacement of the shift spindle 51 causes a shift drum 41 to make rotary movement by way of a shift drum actuating mechanism 52. The rotary movement of the shift drum 41 is transmitted to a shifter gear of a transmission 31 through a shift fork 43 to select an effectively working transmission gear pair out of a plurality of intermeshing transmission gear pairs.

Referring to FIG. 10 (also FIG. 2), a link mechanism 70 is constituted by connecting a shift lever 62 at a lower level to a shift arm 71 projecting from the left end of a shift spindle 51 beyond the crankcase 23, by way of a shift rod 72 directed substantially vertically.

The shift rod 72 includes a lost motion mechanism 73 for transmitting operating forces by way of an elastic member.

The lost motion mechanism 73 operates to absorb impacts due to engagement of the dogs of the dog clutches of the transmission 31, thereby giving the rider on the motorcycle 1 a smooth gear shift feeling. The lost motion mechanism 73 has a shift stroke sensor 75 for detecting expansion and contraction of the shift rod 72 as a result of operation of the lost motion mechanism 73.

The lost motion mechanism 73 includes a coil spring interposed between one longitudinal end of the mechanism and the other longitudinal end, so as to be able to expand and contract. Thus, the shift stroke sensor 75 is a linear stroke sensor capable of detecting relative displacement of the one and the other longitudinal ends of the lost motion mechanism 73.

When speed change action is made on the shift lever 62 and the shift lever 62 is swung to upward or downward, the coil spring of the lost motion mechanism 73 is compressed or expanded, so that the shift stroke sensor 75 can detect the amount of compression or expansion.

The shift stroke sensor 75 is means for detecting an initial change in length of the shift rod 72 of the link mechanism 70, by means of the lost motion mechanism 73, prior to rotary movement of the shift spindle 51 by the shifting action, and the shift stroke sensor 75 can thus detect the shifting action to distinguish whether the shifting action is an upshifting action or a downshifting action.

In the transmission apparatus according to this embodiment, as illustrated in FIG. 11, a first shift spindle sensor 55 and a second shift spindle sensor 155 are mounted on an upper wall 23Ua of the upper crankcase member 23U covering the shift spindle from above. The first and second shift spindle sensors 55 and 155 operate to detect rotational motion of the shift spindle 51. The first and second shift spindle sensors 55 and 155 are positioned to be spaced apart in the direction along the longitudinal axis of the shift spindle 51. The first and second shift spindle sensors 55 and 155 may be identical members in construction to save cost.

Figure 14:
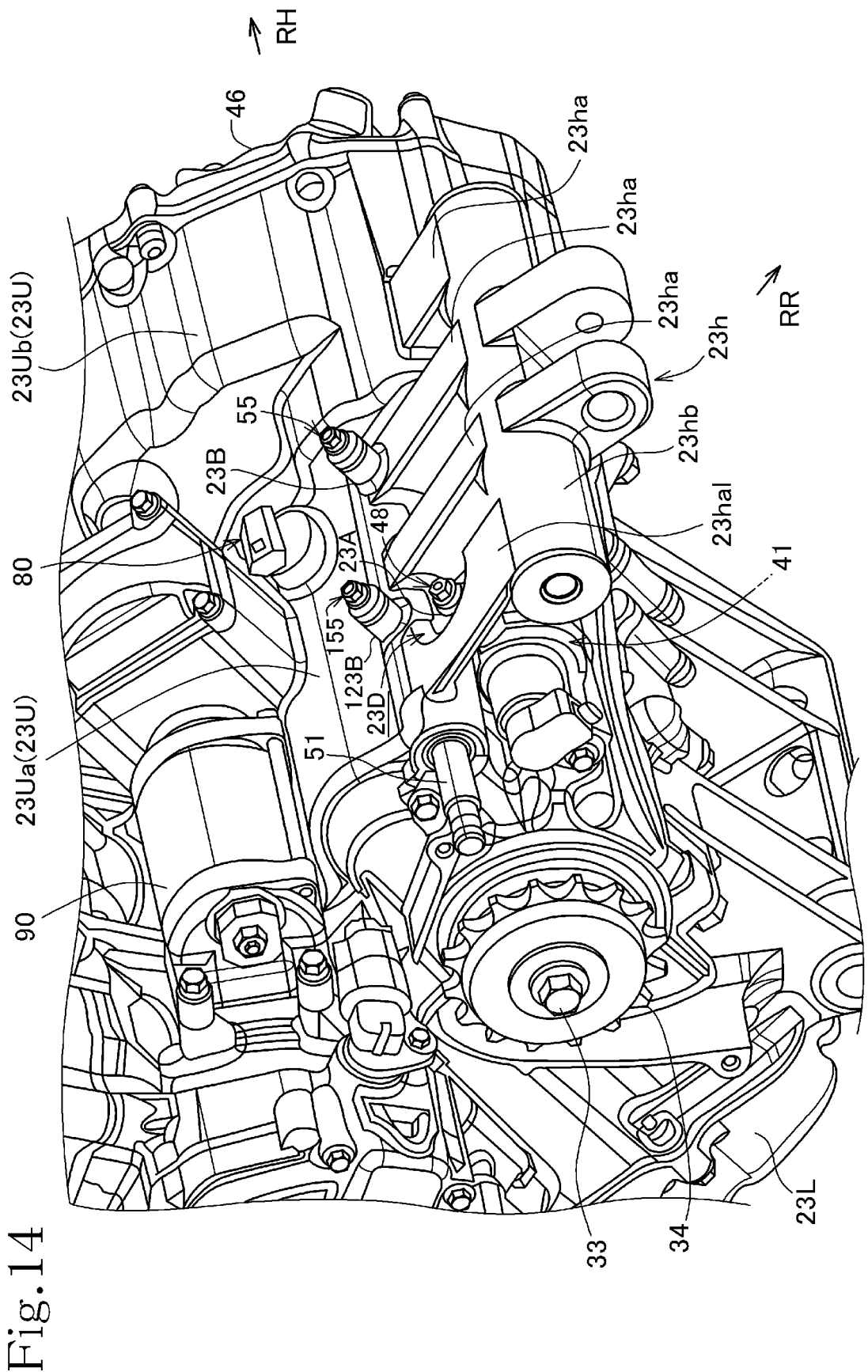
FIG. 14 is a perspective view of the power unit as viewed from the rear side.
Figure 15:
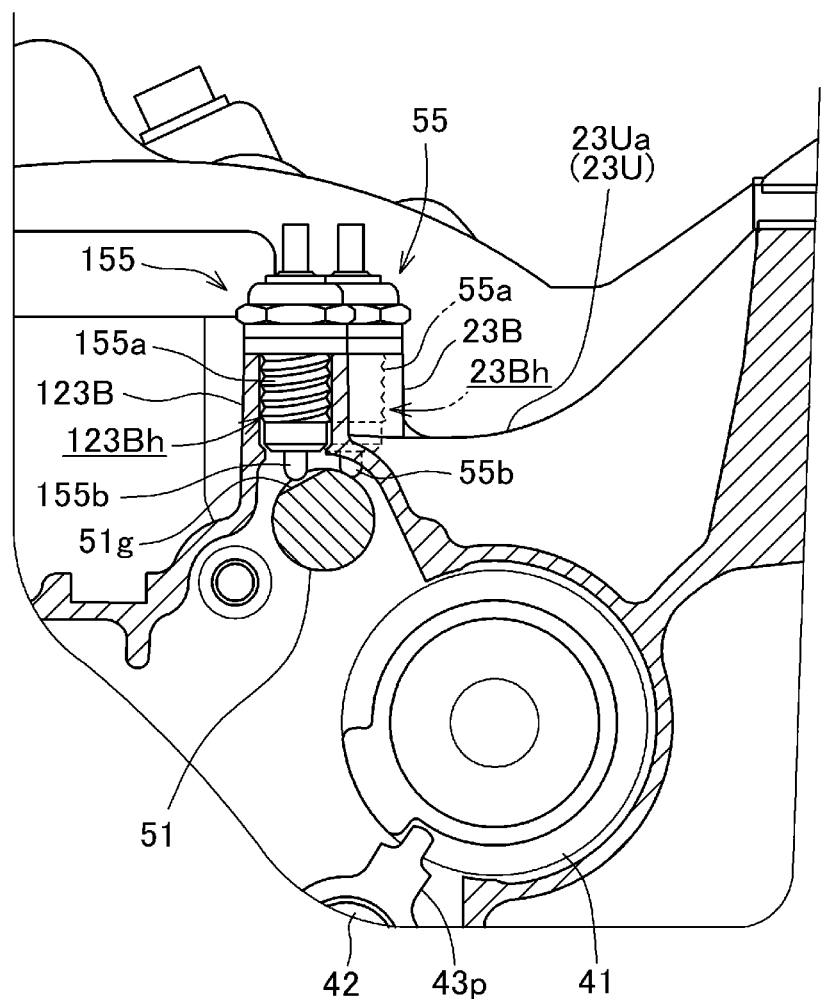
FIG. 15 is a sectional view of a portion of the power unit.

As shown in FIG. 14, the upper wall 23Ua of the upper crankcase member 23U has a transmission clutch accommodating part 23Ub, which is located adjacent to the right end of the shift spindle 51. As illustrated in FIG. 15, a spindle sensor mount seat 23B is provided on the upper wall 23Ua at a position adjacent to the transmission clutch accommodating part 23Ub. The spindle sensor mount seat 23B is formed therein with a spindle sensor mount through hole 23Bh in which the first shift spindle sensor 55 is vertically inserted and screw-engaged therein.

On the other hand, a spindle sensor mount seat 123B is provided on the upper wall 23Ua at a location spaced apart leftward from the spindle sensor mount seat 23B. The spindle sensor mount seat 123B is formed therein with a spindle sensor mount through hole 123Bh in which the second shift spindle sensor 155 is vertically inserted and screw-engaged therein.

Figure 12:
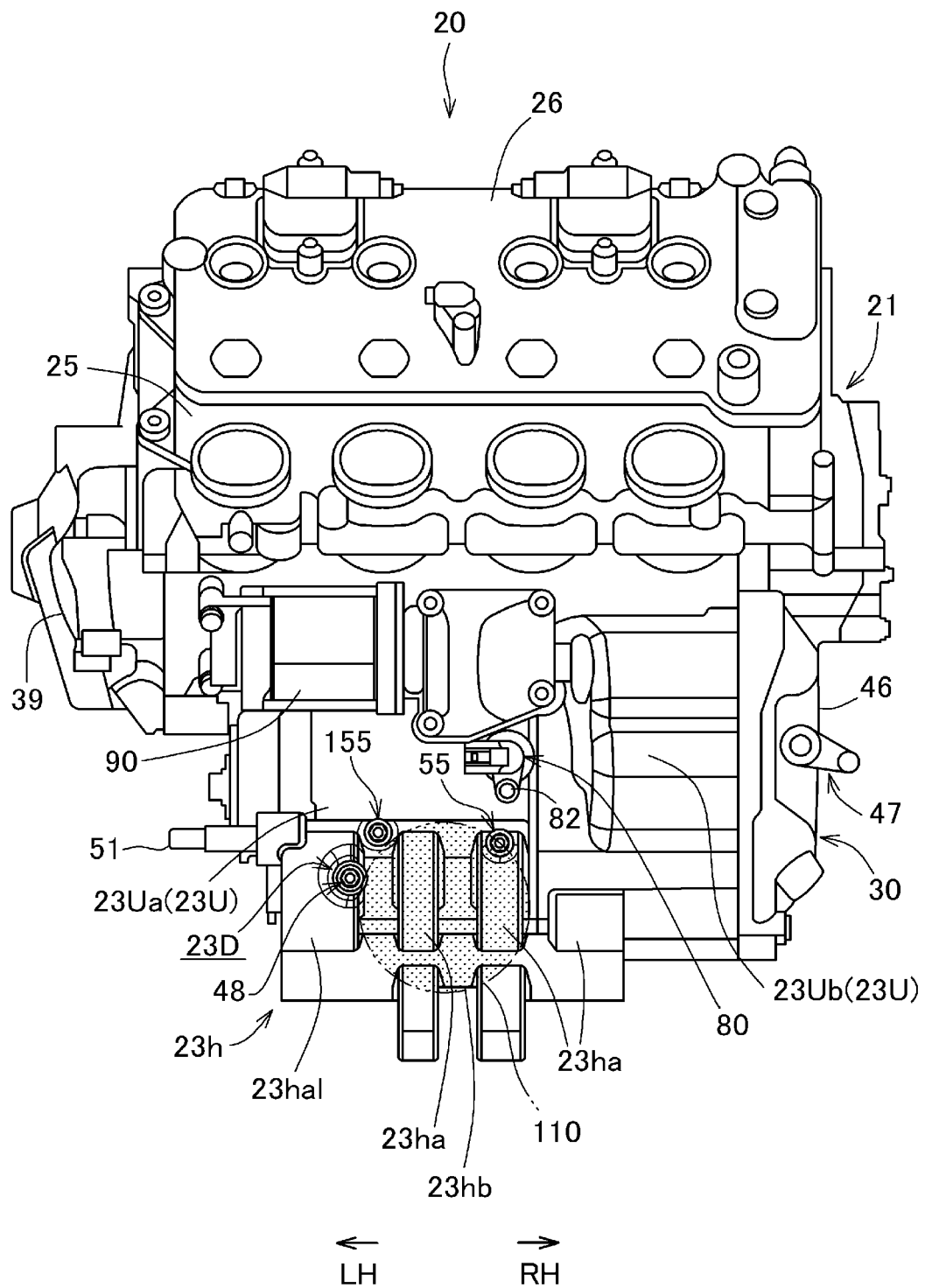
FIG. 12 is a plan view of a power unit mounted on the motorcycle.
Figure 13:
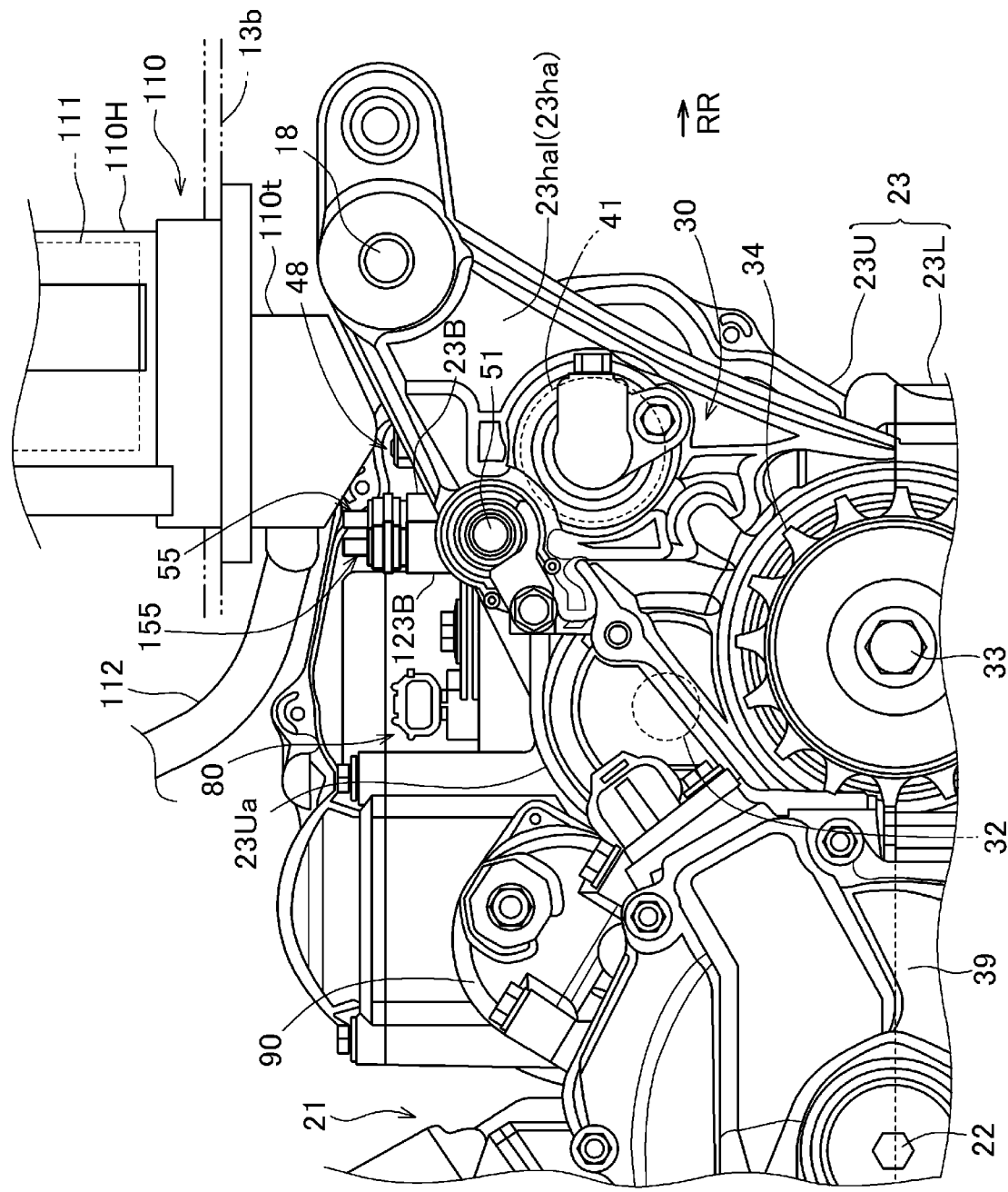
FIG. 13 is a rear side view of the power unit.

As illustrated in FIG. 12, a shift drum sensor 48 is provided to detect rotary movement of the shift drum 41, as in the first embodiment of the invention. The shift drum sensor 48 is inserted and screw-engaged in a through drum sensor mount hole 23Ah (see FIG. 7) extending at right angles to a drum sensor mount seat on the upper wall portion 23Ua (see FIG. 12). The direction in which the shift drum sensor 48 extends in the through drum sensor mount hole 23Ah is a direction parallel to the directions in which the first and second shift spindle sensors 55 and 155 extend in the respective first and second spindle sensor mount through holes 23Bh and 123Bh.

Consequently, the first and second shift spindle sensors 55 and 155, together with the shift drum sensor 48 can be mounted on and dismounted from the outer surface of the upper crankcase member 23U, in the same directions, whereby the mounting and dismounting operations of the first and second shift spindle sensors 55 and 155 and the shift drum sensor 48 can be made easy with improved maintainability.

Furthermore, since the spindle sensor mount through holes 23Bh and 123Bh are directed in the same direction as the through drum sensor mount hole 23Ah, the machining operations on the spindle sensor mount seats 23B and 123B and on the drum sensor mount seat 23A can be made on the same side, which makes it easy to perform the machining operations with resultant excellent machinability.

This means that the above arrangement makes easy the machining operations on the female screws of the spindle sensor mount holes 23Bh and 123Bh in the spindle sensor mount seats 23B and 123B, as well as on the spindle sensor mount seat faces 23Bf and 123Bf. The above arrangement also makes easy the machining operations on the female screw of the drum sensor mount hole 23Ah in the drum sensor mount seat 23A, as well as on the drum sensor mount seat face 23Af.

The first and second shift spindle sensors 55 and 155 are limit switches having spindle sensor bodies 55a and 155a from which spindle sensor actuators 55b and 155b are urged to project under spring forces, respectively. The first and second shift spindle sensors 55 and 155 are made on and off by retracting and advancing movements of the spindle sensor actuators 55b and 155b.

Figure 16:
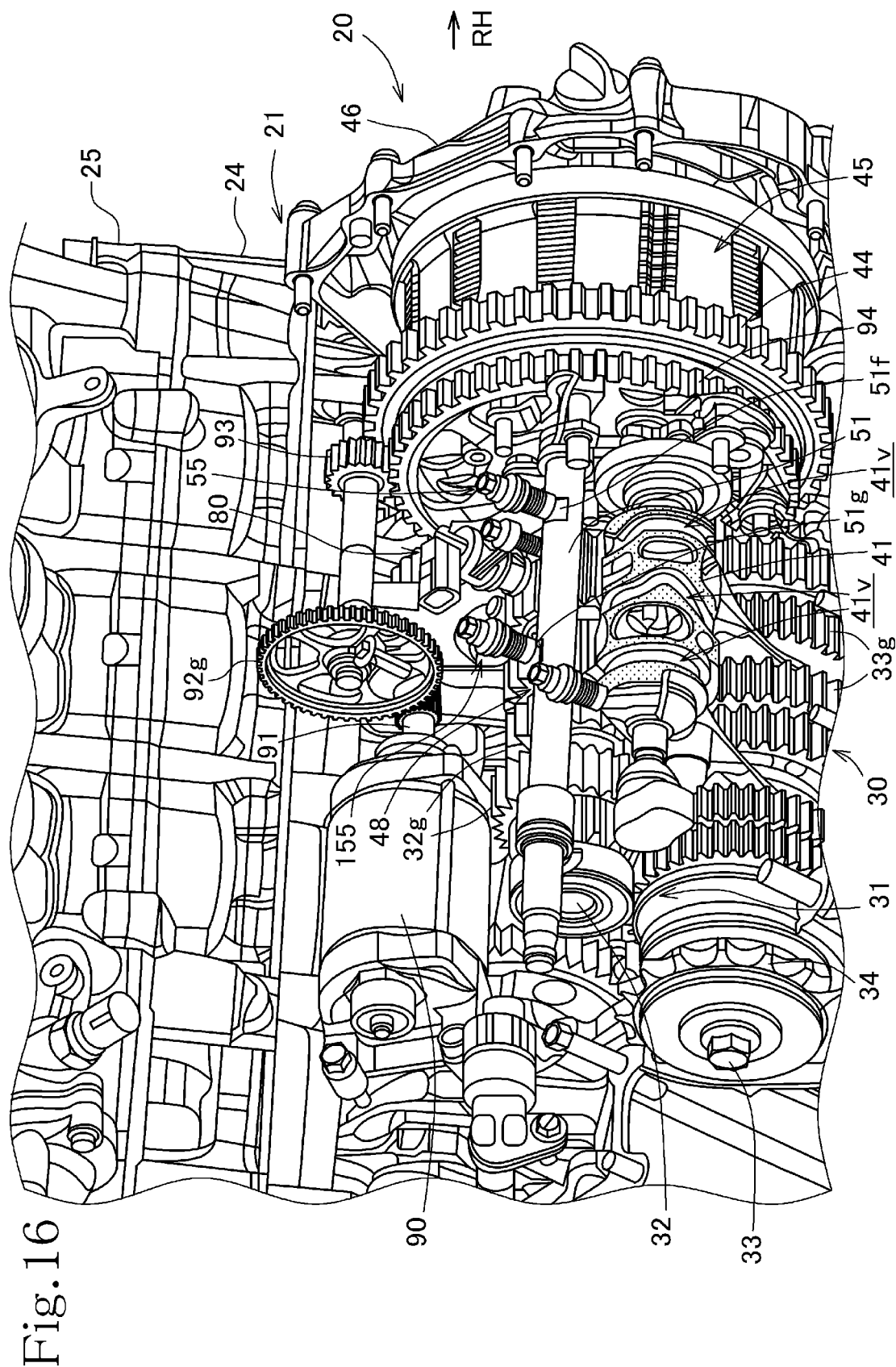
FIG. 16 is a perspective view of the power unit as seen from the rear side, showing the inside of the power unit with a crank case removed.
Figure 17:
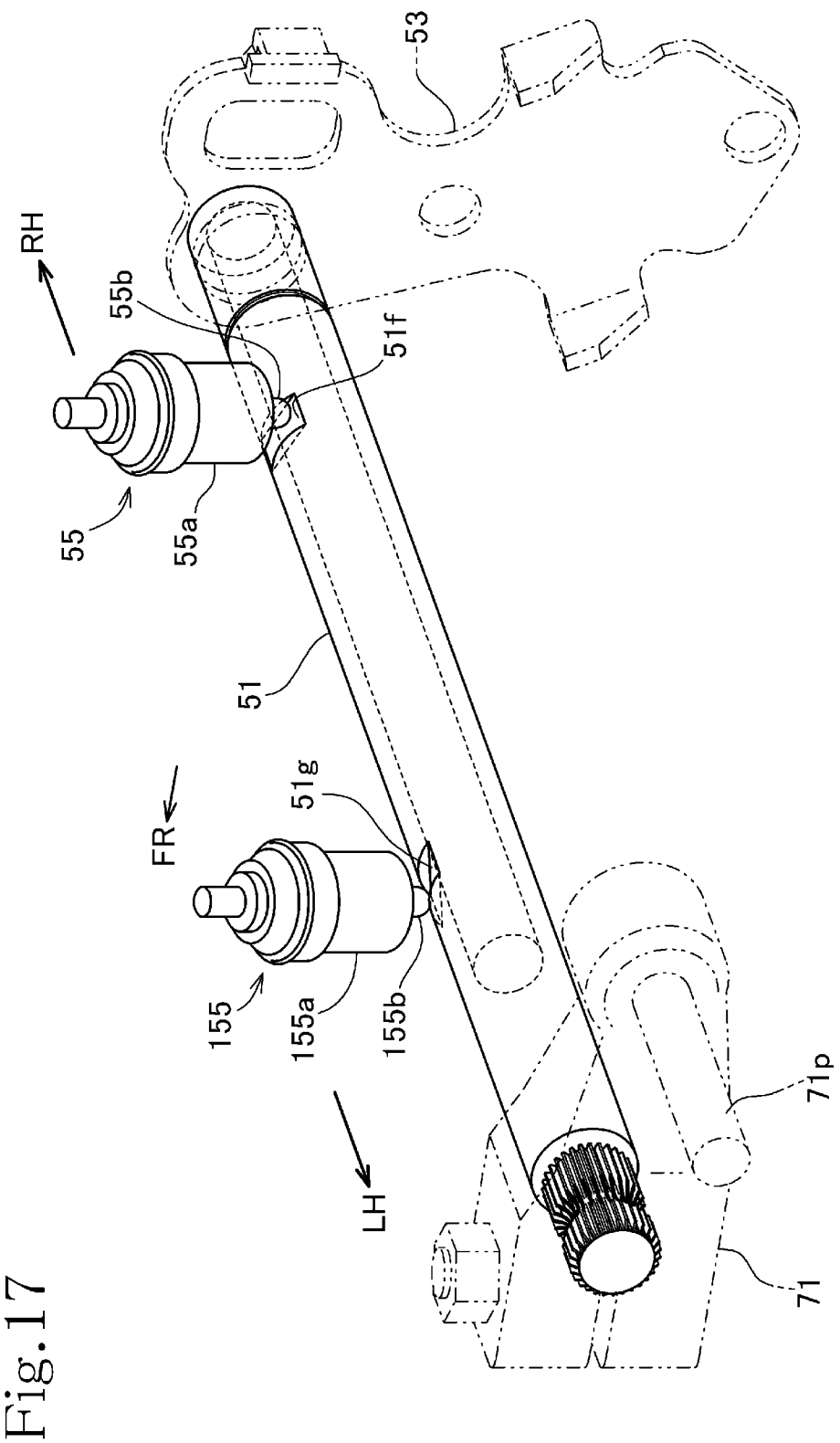
FIG. 17 is a perspective view showing positional relation of first and second shift spindle sensors relative to a shift spindle.

As shown in FIGS. 15 to 17, when the first shift spindle sensor 55 is mounted on the spindle sensor mount seat 23B, the projecting spindle sensor actuator 55b is positioned directly above a flat detectable surface 51f formed near the right end of the shift spindle 51.

Similarly, when the second shift spindle sensor 155 is mounted on the spindle sensor mount seat 123B, the projecting spindle sensor actuator 155b is positioned directly above a flat detectable surface 51g formed near the left end of the shift spindle 51.

The spindle sensor actuator 55b capable of advancing and retracting movement along the length of the first shift spindle sensor 55 is offset somewhat rearward relative to the rotational center axis of the shift spindle 51 oriented horizontally.

Further, the spindle sensor actuator 155*b* capable of advancing and retracting movement along the length of the second shift spindle sensor 155 is offset somewhat forward relative to the rotational center axis of the shift spindle 51 oriented horizontally.

The rearward and forward offset amounts of the spindle sensor actuators 55*b* and 155*b*, relative to the rotational center axis of the shift spindle 51, are approximately equal.

FIG. 15 shows a section of the upper crankcase member 23U covering the shift drum 41 and the shift spindle 51 from above, the section being taken at the location of the second shift spindle sensor 155 and being viewed from the left side.

FIG. 17 shows a perspective view of the shift spindle 51 and the first and second shift spindle sensors 55 and 155, illustrating positional relation of the first and second shift spindle sensors 55 and 155 relative to the shift spindle 51.

Figure 18:
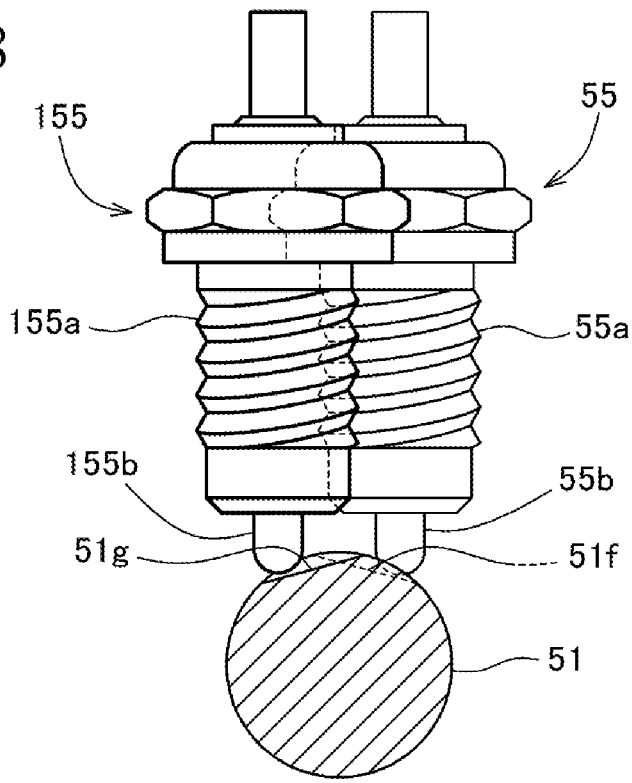
FIG. 18 is a left side view, partly in section, showing the first and second shift spindle sensors relative to the shift spindle, which is in a normal state.

FIG. 18 shows a section of the shift spindle 51, taken at the position of the second shift spindle sensors 155. The section is viewed from the left side of the shift spindle 51, while the shift spindle 51 and the first and second shift spindle sensors 55 and 155 are in the relative positions shown in FIG. 17.

FIGS. 15 to 18 show a normal state in which shifting action is not made and the shift spindle 51 is not rotated In the state shown in FIGS. 15 to 18, the flat detectable surface 51*f* on the right side of the shift spindle 51, to which surface 51*f* the downwardly protruding spindle sensor actuator 55*b* of the first shift spindle sensors 55 is directed, is not parallel to, and makes an angle relative to the flat detectable surface 51*g* on the left side of the shift spindle 51, to which surface 51*g* the downwardly protruding spindle sensor actuator 155*b* of the second shift spindle sensors 155 is directed.

As shown in FIG. 18, in the normal state where the shift spindle 51 has not yet been rotated, the flat detectable surface 51*f* on the upper surface of the right side of the horizontally directed shift spindle 51, faces the downwardly protruding and rearwardly offset spindle sensor actuator 55*b* of the first shift spindle sensors 55 and is downwardly inclined to the rear at an angle of 16°, for example. On the other hand, in the normal state where the shift spindle 51 has not yet been rotated, the flat detectable surface 51*g* on the upper surface of the left side of the horizontally directed shift spindle 51, faces the downwardly protruding and forwardly offset spindle sensor actuator 155*b* of the second shift spindle sensors 155 and is downwardly inclined to the front at an angle of 16°, for example.

In the normal state where the shift spindle 51 has not yet been rotated, as shown in FIG. 18, the spindle sensor actuator 55*b* of the first shift spindle sensors 55 is located adjacent to the flat detectable surface 51*f* but not in contact with the detectable surface 51*f*, so that the spindle sensor actuator 55*b* is in the OFF state. Likewise, the spindle sensor actuator 155*b* of the second shift spindle sensors 155 is located adjacent to the flat detectable surface 51*g* but not in contact with the detectable surface 51*g*, so that the spindle sensor actuator 155*b* is in the OFF state.

It is to be noted that, contrary to the case of the first embodiment, the first and second shift spindle sensor actuators 55*b* and 155*b* of the first and second shift spindle sensors 55 and 155 are in the OFF state when these actuators 55*b* and 155*b* are in the advanced state.

When the shift lever 62 is operated to be swung upward for upshifting operation, the shift rod 72 is moved upward, so that the shift spindle 51 is rotated in the counterclockwise direction as viewed in FIG. 18.

Figure 19:
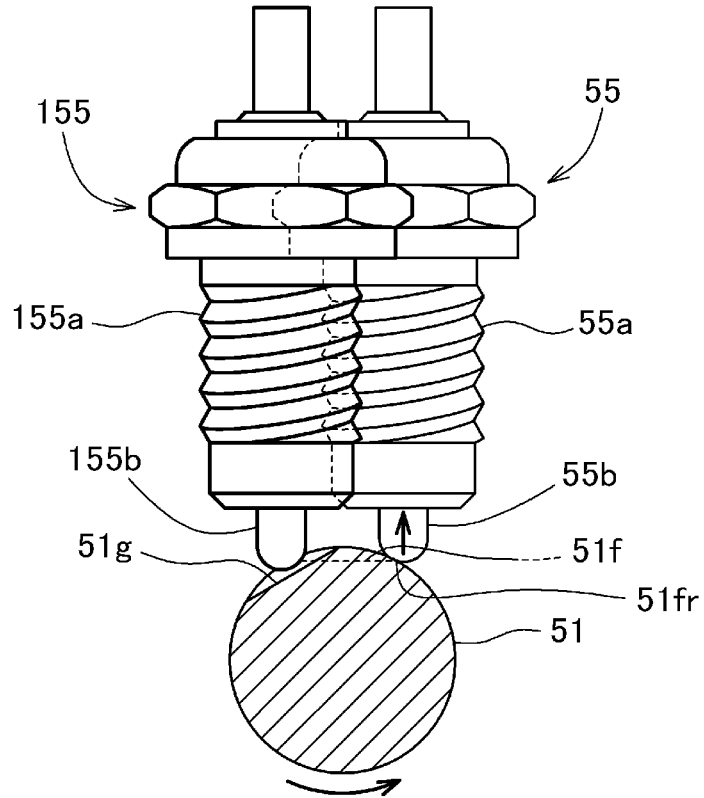
FIG. 19 is a similar left side view showing the first and second shift spindle sensors relative to the shift spindle, which is operated for upshifting operation.

When the counterclockwise rotation of the shift spindle 51 is finished, that is, at the time the upshifting is established, the detectable surface 51*f*, downwardly inclining to the rear, takes a horizontal attitude as a result of the counterclockwise rotation, as shown in FIG. 19. Consequently, a rear end 51*fr* of the detectable surface 51*f* is brought into contact with the shift spindle sensor actuators 55*b* of the first shift spindle sensor 55, to thereby press or push up the shift spindle sensor actuators 55*b*. This brings the first shift spindle sensor 55 in the ON state.

On the other hand, the detectable surface 51*g*, which has faced obliquely forward in the state of FIG. 18, is caused to have an increased inclination toward the front as the shift spindle 51 rotates counterclockwise. However, the detectable surface 51*g* does not reach the shift spindle sensor actuators 155*b* of the second shift spindle sensor 55, so that the second shift spindle sensor 55 remains in the OFF state.

It will be noted that at the time of completion of the counterclockwise rotation of the shift spindle 51, that is, at the time of establishment of the upshifting operation, the first spindle sensor 55 is brought in the ON state, thus ensuring detection of the completion of the upshifting operation.

When the shift lever 62 is operated to be swung downward for downshifting operation, the shift rod 72 is moved downward, so that the shift spindle 51 is rotated in the clockwise direction as viewed in FIG. 18.

Figure 20:
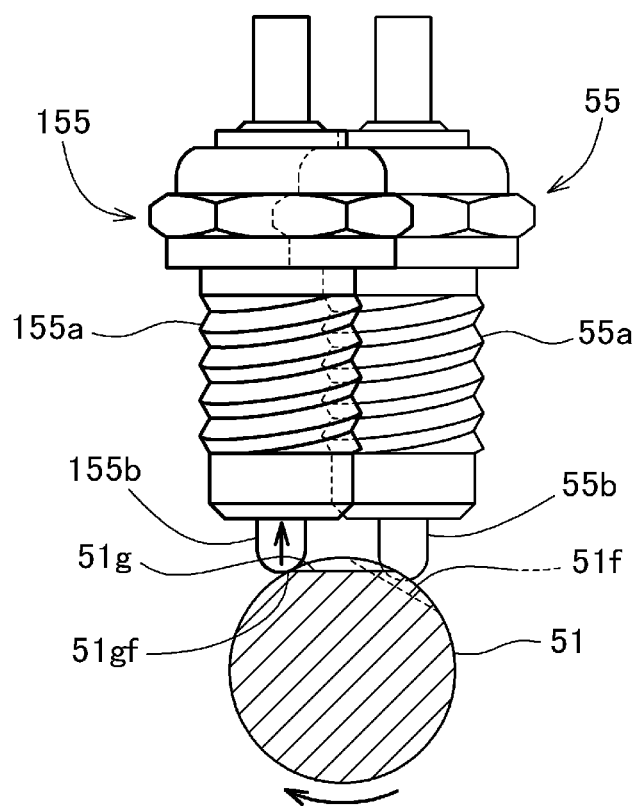
FIG. 20 is a similar left side view when the shift spindle is operated for downshifting operation.

When the clockwise rotation of the shift spindle 51 is finished, that is, at the time the downshifting is established, the detectable surface 51*g*, downwardly inclining to the front, takes a horizontal attitude as a result of the clockwise rotation, as shown in FIG. 20. Consequently, a rear end 51*gr* of the detectable surface 51*g* is brought into contact with the shift spindle sensor actuators 155*b* of the second shift spindle sensor 155, to thereby press or push up the shift spindle sensor actuators 155*b*. This brings the second shift spindle sensor 155 in the ON state.

On the other hand, the detectable surface 51*f*, downwardly inclining to the rear, is caused to have an increased inclination as the shift spindle 51 rotate clockwise. However, the detectable surface 51*f* does not reach the shift spindle sensor actuator 55*b* of the first shift spindle sensor 55, so that first shift spindle sensor 55 is maintained in the OFF state.

It will be noted that at the time of completion of the clockwise rotation of the shift spindle 51, that is, at the time of establishment of the downshifting operation, the second spindle sensor 55 is brought in the ON state, thus ensuring detection of the completion of the downshifting operation.

The motorcycle 1 is installed with a quick-shifting mechanism Q for enabling a speed change operation without the clutching action, by lowering the output of the internal combustion engine 21.

Figure 21:
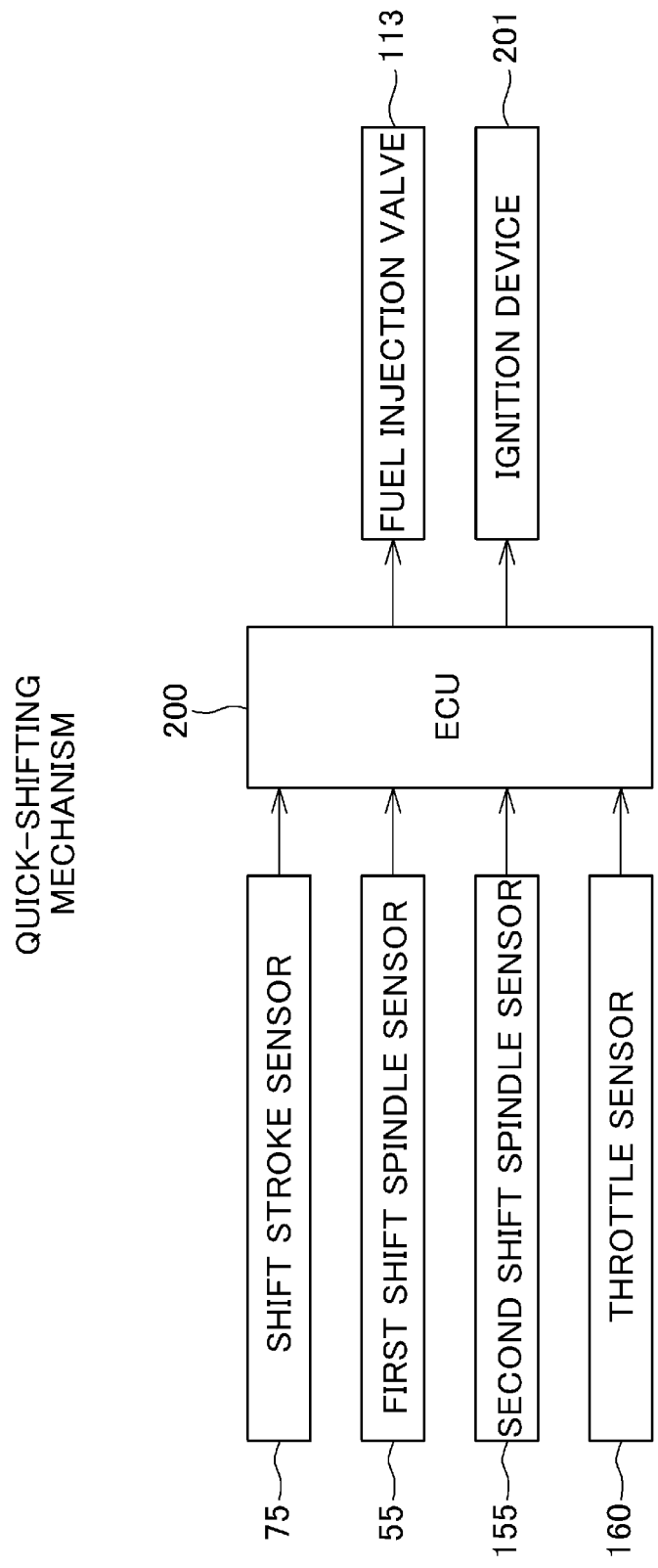
FIG. 21 is a block diagram of a quick-shifting mechanism.

The quick-shifting mechanism Q includes an ECU (electronic control unit) 200 shown in FIG. 21. The ECU 200 operates to control a fuel injection valve 113 and ignition device 201 to lower the output of the internal combustion engine 21.

As illustrated in FIG. 21, detection signals are input to the ECU 200 from the shift stroke sensor 75, the first shift spindle sensor 55 and the second shift spindle sensor 155. The ECU 200 sends control signals to the fuel injection valve 113 and the ignition device 201, to control the motorcycle, based on the detection signals input from the shift stroke sensor 75, the first shift spindle sensor 55 and the second shift spindle sensor 155.

To the ECU 200 is input a signal from a throttle sensor 160 provided in the throttle body 27*t* to detect the degree of opening of the throttle valve.

In the transmission apparatus 30, the ECU 200 operates, in particular, when the shift stroke sensor 75 detects initial movement of the link mechanism 70 as a result of an upshifting operation, to lower the output of the internal combustion engine 21 by controlling the fuel injection valve 113 to stop fuel supply and by controlling the ignition device 201 to delay the ignition timing.

Lowering the output of the engine 21 enables smooth disconnection of the dog clutch of the transmission by reducing the torque transmitted through the transmission without the operation of the transmission clutch 45, whereby speed change operation can be performed smoothly and quickly.

When the shift spindle 51 is rotated by means of the link mechanism 70 for upshifting operation and the upshifting is established with the rotary movement of the shift spindle 51 finished, the first shift spindle sensor 55 is put in the ON state. When the first shift spindle sensor 55 is put in the ON state, the ECU 200 operates to stop the operation of lowering the output of the engine 21 to recover the engine output quickly.

In a case of acceleration of the motorcycle such as a kick-down, the action of the kick-down is judged by the ECU 200 based on the signal from the shift stroke sensor 75 and the signal from the throttle sensor 160, and the ECU 200 controls the fuel injection valve 113 to stop fuel supply and the ignition device 201 to delay the ignition timing, to thereby lower the output of the engine 21. Thus, a smooth and quick speed change operation can be performed without operating the transmission clutch. The lowering of the output of the engine 21 is released to recover the engine output, when the second shift spindle sensor 155 is brought in the ON state as a result of completion of the rotary movement of the shift spindle 51, which means establishment of the state of downshift.

The transmission apparatus according to the second embodiment of the invention as described above provides the advantageous effects as follows.

As illustrated in FIG. 17, the rotary movement of the shift spindle 51 is detected not only by the first shift spindle sensor 55 but also by the second shift spindle sensor 155. Therefore, the rotary movement of the shift spindle 51 can be detected precisely because of the use of the two shift spindle sensors 55 and 155.

As shown in FIGS. 11 and 17, the first shift spindle sensor 55 operates to detect rotary movement of the shift spindle 51 in the case of upshift, and the second shift spindle sensor 155 operates to detect rotary movement of the shift spindle 51 in the case of downshift.

In the motorcycle 1 with the transmission apparatus mounted thereon, when the rider kicks up the shift pedal 63 from below with the big toe, the shift lever 62 is swung up and the shift spindle 51 is rotated counterclockwise as viewed in FIG. 10, to enable upshifting operation. When the rider presses down the shift pedal 63 from above with the big toe on the shift pedal 63, the shift lever 62 is swung down and the shift spindle 51 is rotated clockwise, to enable downshifting operation. The upshifting action is detected by the first shift spindle sensor 55, while the downshifting action is detected by the second shift spindle sensor 155.

In small-size vehicles provided with a shift operating mechanism in which upshifting is made by pressing down the shift pedal and downshifting is made by kicking up the shift pedal, the first shift spindle sensor 55 may be made to detect downshifting action and the second shift spindle sensor 155 may be to detect upshifting action. By doing so, with the positional relation of the first and second shift spindle sensors 55 and 155 relative to the shift spindle 51 as it is, the arrangement shown in FIG. 11 can be used in the above case.

As shown in FIG. 12, the fuel pump unit 110 (shown in dotted pattern) fixed to the bottom plate 13*b* of the fuel tank 13 disposed above the crankcase 23 has at least portion thereof overlapping vertically with the first and second shift spindle sensors 55 and 155, with respect to the longitudinal and widthwise directions of the vehicle. In such an arrangement, the fuel delivery portion 110*t* projecting downward from a central region of the pump unit 110 is located between the first and second shift spindle sensors 55 and 155, with respect to the direction of the length of the shift spindle 51. Therefore, the fuel delivery portion 110*t* can be set without interference with the first and second shift spindle sensors 55 and 155, whereby the fuel pump unit 110 can be installed at a lowered position as possible, close to the crankcase 23. This means that the bottom plate 13*b* of the fuel tank 13 attached to the fuel pump unit 110 can be lowered, whereby the total volume of the fuel tank 13 can be increased as much as possible.

With reference to FIG. 21, the motorcycle 1 is mounted thereon the quick-shifting mechanism Q for enabling a speed change operation without the clutching action by lowering the output of the internal combustion engine 21. The quick-shifting mechanism Q is operated by detection signal from the shift stroke sensor 75 detecting initial movement of the link mechanism 70 and by detection signals from the first and second shift spindle sensors 55 and 155. The quick-shifting mechanism Q performs reduction of the output of the internal combustion engine base on the signal from the shift stroke sensor 75 and performs release of the engine output reduction based on signals from the first and second shift spindle sensors 55 and 155. For this reason, the quick-shifting mechanism Q enables engine output control at a proper timing, as well as a reduction in transmission torque, with resultant smooth disengagement of the dog clutch in the transmission and with resultant smooth and quick speed change of the transmission.

Although the two embodiments of the transmission apparatus 30 according to the present invention have been described in detail above, the present invention is not limited to the above embodiments, but many changes and modifications may be made therein without departing from the scope of the invention.

The transmission apparatus 30 according to the embodiments of the present invention changes transmission gear positions when the shift lever 62 is operated to turn the shift spindle 51 through the link mechanism 70. However, the shift spindle may, for example, be turned by an actuator such as an electric motor to cause the transmission apparatus 30 to change transmission gear positions, as disclosed in Patent Document 1 referred to above.

The detectable surface 51*f* of the shift spindle 51 is not limited to the illustrated flat shape, but may be formed as an uneven surface.

DESCRIPTION OF REFERENCE SIGNS

1 . . . Motorcycle, 2 . . . Vehicle frame, 3 . . . Main frame, 3*a* . . . Head pipe, 4 . . . Center frame, 5 . . . Seat rail, 13 . . . Fuel tank, 13*b* . . . Bottom plate, 14 . . . Seat, 16 . . . Support bracket, 17 . . . Back step, 20 . . . Power unit, 21 . . . Internal combustion engine, 22 . . . Crankshaft, 23 . . . Crankcase, 23U . . . Upper crankcase member, 23Ua . . . Upper wall, 23D . . . Recess, 23A . . . Drum sensor mount seat, 23Af . . . Drum sensor mount seat face, 23Ah . . . Through drum sensor mount hole, 23B . . . Spindle sensor mount seat, 23Bf . . . Spindle sensor mount seat face, 23Bh . . . Through spindle sensor mount hole, 23C . . . Rotational sensor mount seat, 23h . . . Hanger, 23Ub . . . Clutch housing, 23Uc . . . Bulging portion, 23L . . . Lower crankcase member, 30 . . . Transmission apparatus, 31 . . . Transmission, 32 . . . Main shaft, 33 . . . Countershaft or output shaft, 37 . . . Output sprocket cover, 38 . . . AC generator, 39 . . . ACG cover, 41 . . . Shift drum, 41f . . . Detectable surface, 41fp . . . Projection tip, 42 . . . Shift fork shaft, 43 . . . Shift fork, 44 . . . Primary driven gear, 45 . . . Transmission clutch, 46 . . . Clutch cover, 47 . . . Clutch actuator, 48 . . . Shift drum sensor or neutral switch, 48a . . . Drum sensor body, 48b . . . Drum sensor actuator 48f . . . Flange, 51 . . . Shift spindle, 51f . . . Detectable surface, 52 . . . Shift drum actuating mechanism, 53 . . . Ratchet arm, 55 . . . (First) shift spindle sensor, 55a . . . Spindle sensor body, 55b . . . Spindle sensor actuator, 55f . . . Flange, 60 . . . Support bracket, 61 . . . Shift support shaft, 62 . . . Shift lever, 63 . . . Shift pedal, 64 . . . Pin, 70 . . . Link mechanism, 71 . . . Shift arm, 72 . . . Shift rod, 73 . . . Lost-motion mechanism, 75 . . . Shift stroke sensor, 80 . . . Rotational speed sensor, 80a . . . Sensor body, 80b . . . Detector, 81 . . . Lock arm, 82 . . . Bolt, 90 . . . Starter motor, 91 . . . Drive shaft, 92 . . . Large-diameter gear, 93 . . . Small-diameter gear, 94 . . . Starter driven gear 101 . . . Shift spindle, 111 . . . Fuel pump, 112 . . . Fuel supply hose, 113 . . . Fuel injection valve, 155 . . . Second shift spindle sensor, 155a . . . Spindle sensor body, 155b . . . Spindle sensor actuator, 160 . . . Throttle sensor, Q . . . Quick-shifting mechanism, 200 . . . ECU (Electronic control unit), 201 . . . Ignition device.

The invention claimed is:

1. A transmission apparatus incorporated in a power unit mounted on a small-size vehicle and including a shift spindle rotatable in response to a gear shifting action, a shift drum rotatable through a shift drum actuating mechanism by rotation of the shift spindle, and a case covering the shift spindle and the shift drum, the transmission apparatus comprising:
   a shift spindle sensor for detecting rotary movement of the shift spindle; and
   a shift drum sensor for detecting rotary movement of the shift drum;
   wherein the shift spindle sensor is mounted in and extends through a through spindle sensor mount hole defined in a spindle sensor mount seat formed on a predetermined portion of the case;
   the shift drum sensor is mounted in and extends through a through drum sensor mount hole defined in a drum sensor mount seat formed on a predetermined portion of the case;
   a direction in which the shift spindle sensor is mounted in and extends through the through spindle sensor mount hole is same as a direction in which the shift drum sensor is mounted in and extends through the through drum sensor mount hole,
   the drum sensor mount seat is provided on a bottom wall of a recess defined in the case and extending inward from an outer surface of the case,
   the power unit is suspended from a vehicle body frame of the small-size vehicle through a projecting hanger of the case; and
   the shift drum sensor is mounted on the drum sensor mount seat on the bottom wall of the recess.

2. The transmission apparatus as claimed in claim 1, wherein the shift spindle sensor is a limit switch having a spindle sensor actuator projecting from a spindle sensor body, and is operable to be selectively turned on and off in response to advancing and retracting movement of the spindle sensor actuator, which is held in contact with a detectable surface on a part of an outer circumferential surface of the shift spindle;
   the shift drum sensor is a limit switch having a drum sensor actuator projecting from a drum sensor body, and is operable to be selectively turned on and off in response to advancing and retracting movement of the drum sensor actuator, which is held in contact with a detectable surface on a part of an outer circumferential surface of the shift drum; and
   directions of advancing and retracting movement of the spindle sensor actuator are same as directions of advancing and retracting movement of the drum sensor actuator.

3. The transmission apparatus as claimed in claim 1, wherein the shift spindle and the shift drum have respective rotational central axes extending parallel to each other and are staggered horizontally with respect to each other such that they are kept out of vertical alignment with each other; and
   the spindle sensor mount seat and the drum sensor mount seat are formed on an upper wall of the case covering the shift spindle and the shift drum from above.

4. The transmission apparatus as claimed in claim 1, wherein a rotational speed sensor for detecting rotation of a transmission gear rotatably supported on a transmission gear shaft of the transmission apparatus is provided, and the rotational speed sensor is mounted in and extends through the case at a position closer to one of the shift spindle sensor and the shift drum sensor than to the other of the shift spindle sensor and the shift drum sensor.

5. The transmission apparatus as claimed in claim 4, wherein the shift drum sensor is mounted on the drum sensor mount seat formed on a portion of the case adjacent to one end of the shift drum in rotational central axis directions thereof; and
   the rotational speed sensor is mounted on a portion of the case adjacent to another end of the shift drum which is opposite to the one end in the rotational central axis directions thereof.

6. The transmission apparatus as claimed in claim 1, wherein, at a position separated from the shift spindle sensor along a longitudinal direction of the shift spindle, a second shift spindle sensor for detecting rotary movement of the shift spindle is provided on the case.

7. The transmission apparatus as claimed in claim 6, wherein the first-named shift spindle sensor is for detecting rotary movement of the shift spindle in one direction, and the second shift spindle sensor is for detecting rotary movement of the shift spindle in the other direction.

8. The transmission apparatus as claimed in claim 6, wherein the small-size vehicle includes center frames extending rearward from left and right main frames extending from a head pipe;

a fuel tank is mounted between the center frames;

a fuel pump unit having a fuel pump with a fuel delivery portion is mounted on a bottom plate of the fuel tank with the fuel delivery portion protruding downward from the bottom plate;

the fuel tank is positioned above the case; and at least a portion of the fuel pump unit is in vertically overlapping relation with the first-named shift spindle sensor and the second shift spindle sensor.

9. The transmission apparatus as claimed in claim 6, wherein the small-size vehicle is mounted thereon with a quick-shifting mechanism for lowering output of the engine to perform speed change operation without transmission clutch operation;

the shift spindle is configured to rotate by a shifting operation of a shift lever by way of a link mechanism;

a shift sensor is provided for detecting initial movement of the link mechanism due to a shifting action; and the quick-shifting mechanism is operable based on a detection signal from the shift sensor and on detection signals from the first-named shift spindle sensor and the second shift spindle sensor.

10. A transmission apparatus incorporated in a power unit mounted on a small-size vehicle and including a shift spindle rotatable in response to a gear shifting action, a shift drum rotatable through a shift drum actuating mechanism by rotation of the shift spindle, and a case covering the shift spindle and the shift drum, the transmission apparatus comprising:

a shift spindle sensor for detecting rotary movement of the shift spindle; and a shift drum sensor for detecting rotary movement of the shift drum;

wherein the shift spindle sensor is mounted in and extends through a through spindle sensor mount hole defined in a spindle sensor mount seat formed on a predetermined portion of the case;

the shift drum sensor is mounted in and extends through a through drum sensor mount hole defined in a drum sensor mount seat formed on a predetermined portion of the case;

a direction in which the shift spindle sensor is mounted in and extends through the through spindle sensor mount hole is same as a direction in which the shift drum sensor is mounted in and extends through the through drum sensor mount hole, and wherein a rotational speed sensor for detecting rotation of a transmission gear rotatably supported on a transmission gear shaft of the transmission apparatus is provided, and the rotational speed sensor is mounted in and extends through the case at a position closer to one of the shift spindle sensor and the shift drum sensor than to the other of the shift spindle sensor and the shift drum sensor.

11. The transmission apparatus as claimed in claim 10, wherein the shift drum sensor is mounted on the drum sensor mount seat formed on a portion of the case adjacent to one end of the shift drum in rotational central axis directions thereof; and the rotational speed sensor is mounted on a portion of the case adjacent to another end of the shift drum which is opposite to the one end in the rotational central axis directions thereof.

* * * * *